July 2, 1968  TADASHI TAKAHASHI  3,390,733
WEIGHING APPARATUS

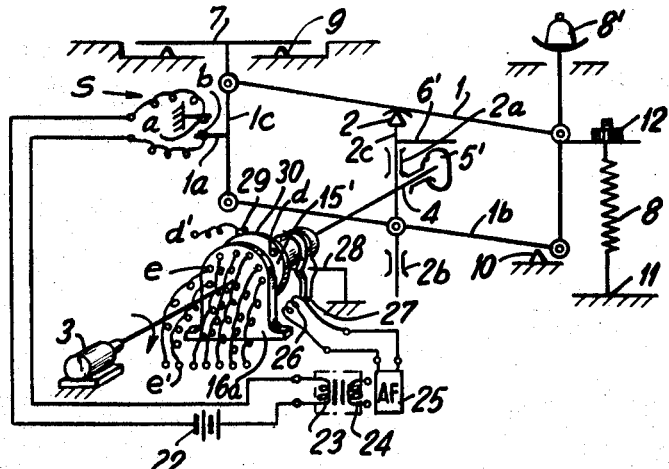
FIG. 3
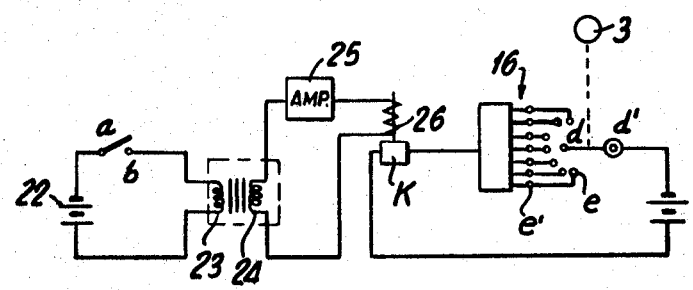
FIG. 3-A
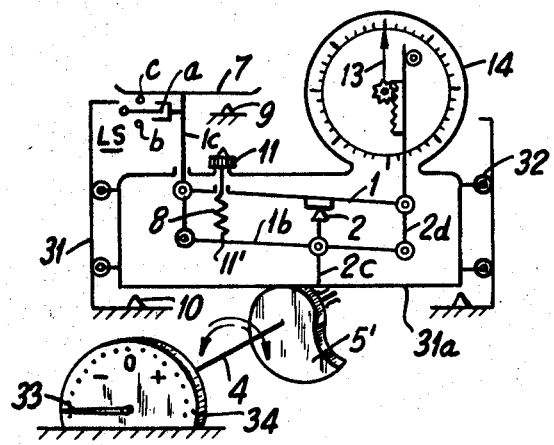
FIG. 4

Filed Nov. 9, 1966  15 Sheets-Sheet 6

INVENTOR
TADASHI TAKAHASHI
BY
McGlew & Toren
ATTORNEYS

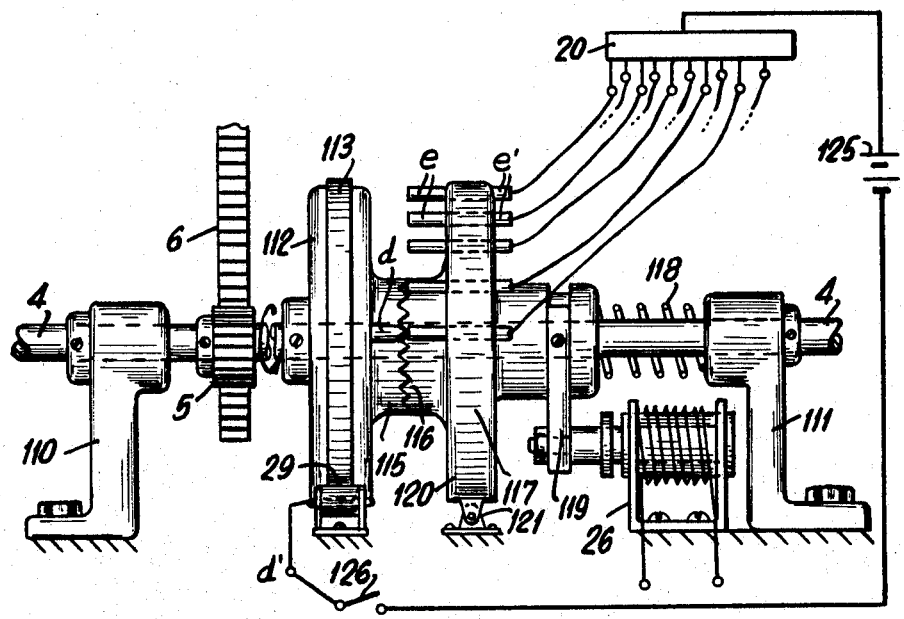
FIG.11-A
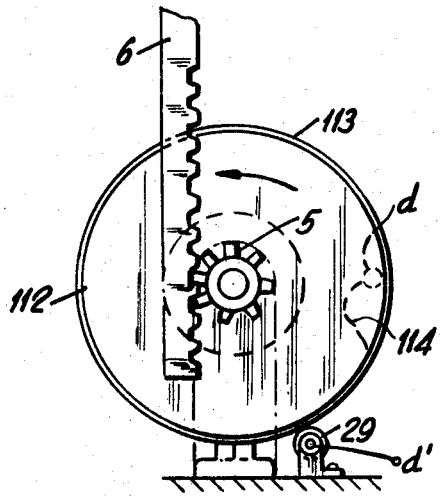
FIG.11-B
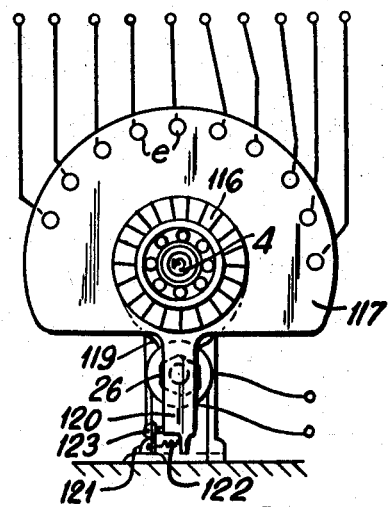
FIG.11-C

July 2, 1968  TADASHI TAKAHASHI  3,390,733
WEIGHING APPARATUS
Filed Nov. 9, 1966  15 Sheets-Sheet 8
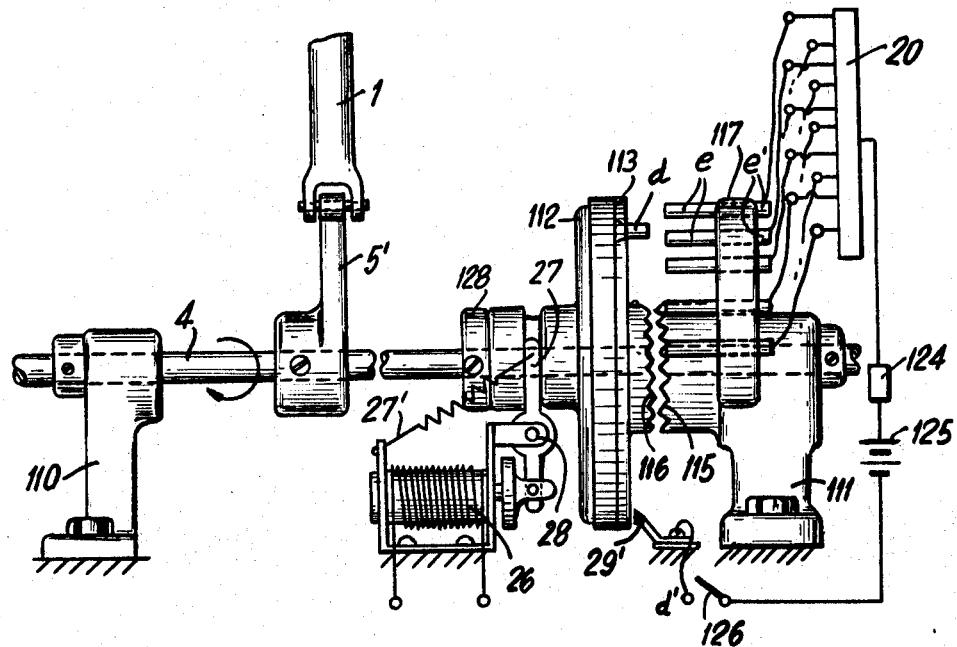
FIG. 12-A
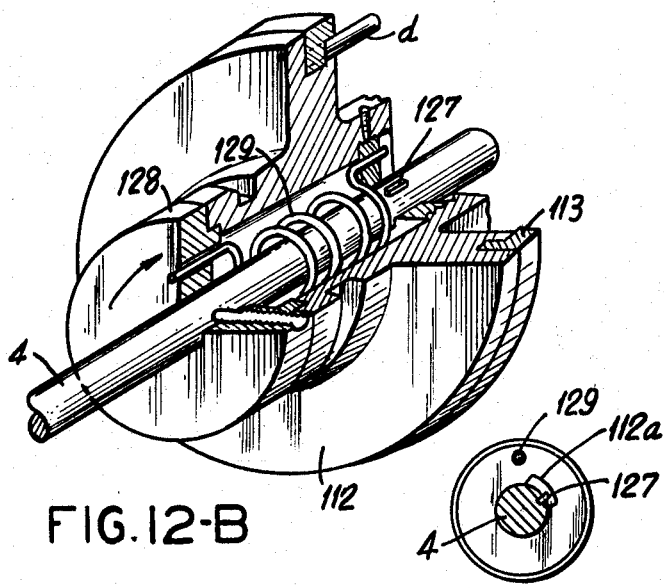
FIG. 12-B
FIG. 12-C
INVENTOR
TADASHI TAKAHASHI
BY McGlew & Toren
ATTORNEYS July 2, 1968  TADASHI TAKAHASHI  3,390,733
WEIGHING APPARATUS
Filed Nov. 9, 1966  15 Sheets-Sheet 12
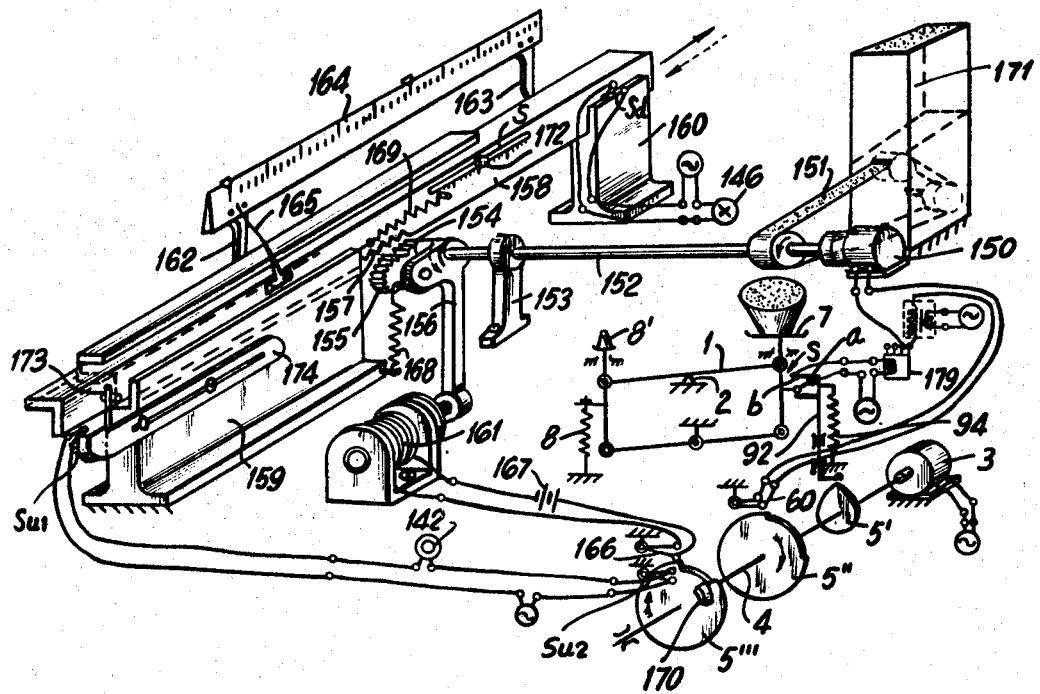
FIG.16-A
INVENTOR
TADASHI TAKAHASHI
BY *McGlew & Toren*
ATTORNEYS

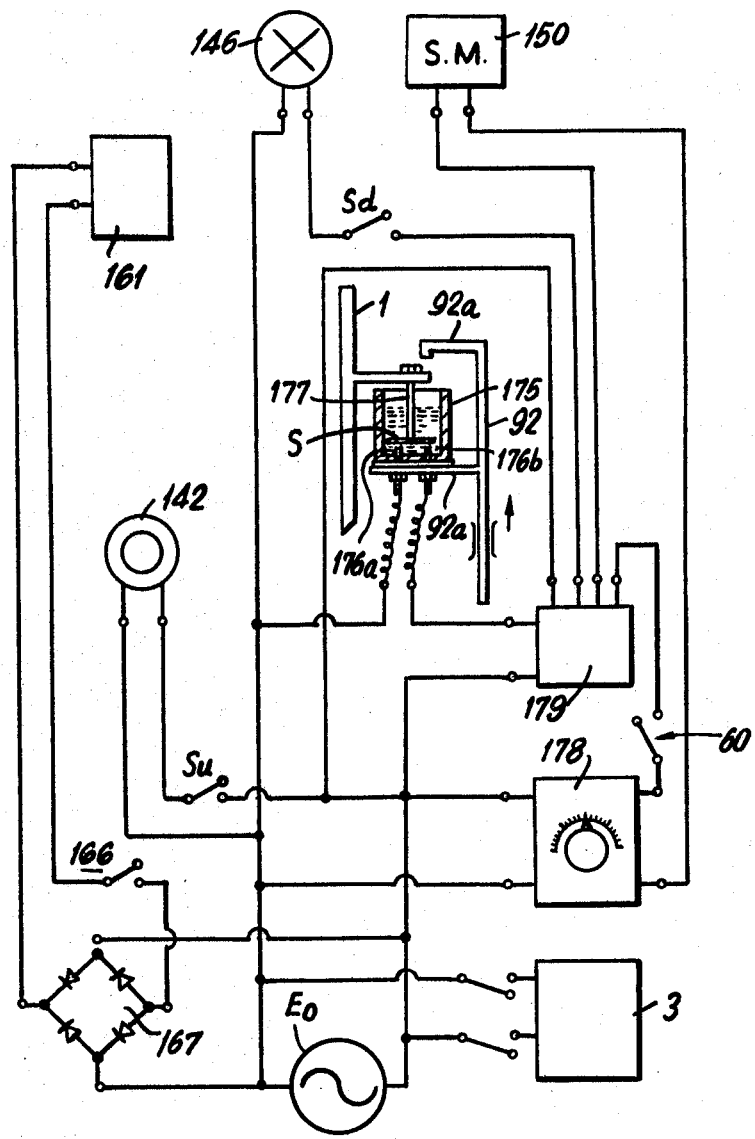
FIG.16-B

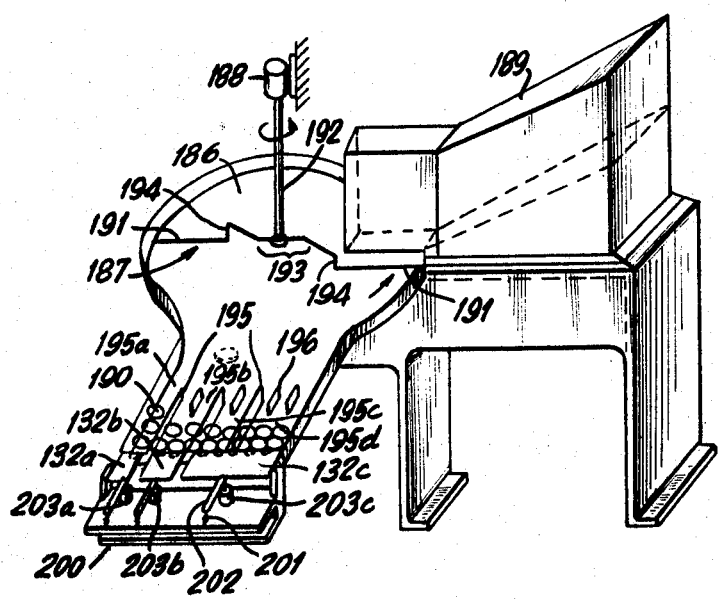
FIG.17-A
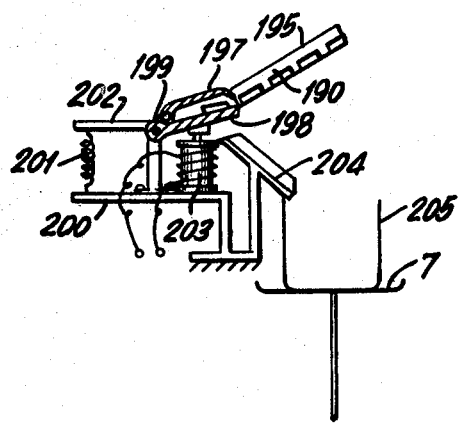
FIG.17-B 3,390,733
WEIGHING APPARATUS
Tadashi Takahashi, 169 Yokoya, Uosaki-cho,
Higashinada-ku, Kobe, Japan
Continuation-in-part of application Ser. No. 428,081,
Jan. 26, 1965. This application Nov. 9, 1966, Ser.
No. 593,121
Claims priority, application Japan, Feb. 4, 1964,
39/5,372
5 Claims. (Cl. 177—169)

ABSTRACT OF THE DISCLOSURE

A weighing and dispensing apparatus having a pivotally supported balance beam equipped with a scale plate pivotally connected thereto and a counter balance means connected thereto. The apparatus includes support means limiting gravitational movement of the scale plate to a fixed limiting position, and includes a reversible motor operable, responsive to engagement of the scale plate with the support means, to rotate its output shaft which is connected by a transmission means to the balance beam so as to displace the balance beam in a direction to increase the force of the counter balance means in proportion to the angular displacement of the motor output shaft.

The scale plate is disengaged from the support means when the counter balance force balances the gravitational force acting on the scale plate. Means are provided to measure the difference between the angular displacement of the shaft, when the counter balance force balances the gravitational force, and a predetermined angular displacement of the shaft, when the balance beam is balanced with a preselected weight.

Background of the invention

This application is a continuation-in-part of my abandoned application Ser. No. 428,081, filed Jan. 26, 1965, for "Weighing Method."

This invention relates to a weighing apparatus, more particularly to a weighing apparatus for dispensing pourable commodities into a plurality of sub-groups of a certain predetermined constant weight, wherein said commodities can be either in solid state, such as masses, grains, and powder particles, or in liquid state, and to a weighing apparatus for assorting a plurality of articles according to the weight thereof.

There are various continuous weighing machines which have hitherto been used for dispensing and assorting operations, but these machines generally have shown considerable errors. These errors are due mainly to the fact that the pourable commodities or articles to be weighed are dropped onto a scale plate of the machine and the mechanical impulse force caused by such dropping acts upon a balancing system of the machine so as to increase the apparent net weight of the commodities or articles to be weighed. Thus, the apparent weight of the commodities or articles determined by such machines tends to exceed the true weight thereof, or the quantity thereof tends to be short of the true quantity for the weight thus determined. To avoid such errors, it has been the practice to shift the balanced position of the machine toward the plus side. However, such shifting of balancing position enables only empirical compensation of deficit weight or weight deficiency, and it does not enable true and accurate weighing for dispensation. In addition, the flow of the pourable commodities or articles to be weighed shows considerably irregularity, especially when such commodities or articles to be weighed are of massive or granular shape, the flow rate of said massive or granular-shaped commodities or articles falling from the chute onto the weighing machine is ever changing, and hence the magnitude of the impulse force acting on the weighing machine in addition to the gravitational force representing the true weight of the commodities or articles is not constant, which leads to an inevitable error due to the unpredictable impulse forces.

The present invention provides a weighing operation which is not affected by such impulse forces due to falling of the commodities or articles delivered to a weighing machine. The weighing operation of the invention is effected by initially absorbing the impulse forces, of commodities or articles dropped onto the scale plate of a weighing device, by a rigid support member, in order to prevent these forces from being transmitted to the balancing system. Thereafter, a portion of the balancing system is shifted, by applying to the balancing system, an external force in a direction to relieve the rigid support member from the weight of the commodities or articles, and detecting or measuring the displacement of the balancing system required to shift the same from the initial no-load balanced condition to the loaded balanced condition with the commodities or articles placed on the weighing machine.

The principal object of the invention is to provide a weighing apparatus for dispensing pourable commodities into a number of groups of a desired weight, in which a pre-dispensed quantity of said commodities is placed on a scale plate pivotally connected to a balance beam, the pre-dispensed quantity weighing less than the desired weight, the gravitational force acting on the commodities on the scale place is supported by a support means to hold the scale supported at a fulcrum thereof and connected to a counterbalance means so as to have a variable counterbalance force acting at a point of the balance beam, a reversible motor is started responsive to the supporting of said scale plate by the support means, an external force is applied to a point of the balance beam so as to increase the variable counterbalance force by transmitting the rotation of the shaft of the reversible motor through a transmission means, the external force being proportional to the magnitude of the angular displacement of the shaft, the supporting of the scale plate is released when the variable counterbalance force is so increased as to substantially balance the gravitational force acting on the commodities on the scale plate, the weight of commodities on the scale plate is represented by the angular displacement of the shaft when the scale plate is released from the support, a deficit weight of the pre-dispensed commodities from the desired weight is detected as the difference between the angular displacement of the shaft when the variable counterbalance force balances the pre-dispensed commodities on the scale plate and a predetermined angular displacement of the shaft when the balance beam is balanced with commodities of desired weight on the scale plate, and the pre-dispensed quantity of commodities is supplemented by feeding the commodities, in an amount equal to the deficit weight, by a supplementing means actuated by a relay means responsive to detection of the deficit weight.

Another object of the invention is to provide a weighing apparatus for sorting articles according to weight thereof, in which an article is placed on a scale plate pivotally connected to a balance beam, the gravitational force acting on the article on the scale plate is supported by a support means to hold the scale plate at a certain position, the balance beam being pivotally supported at a fulcrum thereof and connected to a counterbalance means so as to have a variable counterbalance force acting at a point of the balance beam, a reversible motor is started responsive to supporting of the scale plate by the support means, an external force is applied to a point of the balance beam so as to increase the variable counterbalance force by transmitting the rotation of the shaft of the reversible motor through a transmission means, the external force being proportional to the magnitude of the angular displacement of the shaft, and the scale plate is inverted so as to transfer the article to a sorting means when the variable counterbalance force is so increased as to substantially balance the gravitational force acting on the article on the scale plate, the sorting means having a shaft adapted to be rotated through an angle proportional to the angular displacement of the motor shaft.

It is another object of the invention to provide a weighing apparatus for dispensing pourable commodities into a number of groups of a desired weight, in which a pre-dispensed quantity of the commodities is placed on a scale plate pivotally connected to a balance beam, the pre-dispensed quantity weighing less than the desired weight, the gravitational force acting on the commodities on the scale plate is supported by a support means to hold the scale plate at a certain position, the balance beam being pivotally supported at a fulcrum thereof and connected to a counterbalance means so as to have a variable counterbalance force acting at a point of the balance beam, a reversible motor is started responsive to supporting of the scale plate by the support means, an external force is supplied to a point of the balance beam so as to increase the variable counterbalance force by transmitting the rotation of the shaft of the reversible motor through a transmission means, the external force being proportional to the magnitude of the angular displacement of the shaft of said reversible motor, the supporting of the scale plate is released when the variable counterbalance force is so increased as to substantially balance the gravitational force acting on the commodities on the scale plate, the shaft is connected to a transmission means to actuate a movable member of a differential transformer responsive to release of the supporting of the scale plate, the weight on the commodities of the scale plate is represented by the angular displacement of the shaft when the scale plate is released from said support, a cam having at least one notch formed on the circumference thereof is secured to the shaft of the reversible motor, an actuating bar of magnetic material is provided to fit in the notch of the cam, the actuating bar being located at a position related with that angular position of the shaft at which the variable counterbalance force is increased to a level balancing the desired weight, the actuating bar is biased with a spring force to keep the actuating bar normally away from the cam, a solenoid is provided to force the actuating bar into the notch of the cam against the spring force, the solenoid is energized responsive to release of the scale plate from the support means to force the actuating bar into the notch of the cam to rotate the shaft of the reversible motor to such angular position, the difference between the weight of the pre-dispensed commodities and the desired weight is detected, by means of the differential transformer, as the difference between the angular displacement of the shaft when the variable counterbalance force balances the pre-dispensed commodities on the scale plate and a predetermined angular displacement corresponding to such angular position of said shaft, and the quantity of pre-dispensed commodities is supplemented by feeding commodities of a weight equal to the deficit weight by a supplementing means actuated by a relay means responsive to detection of the deficit weight.

In the following description, what is meant by the "loaded balanced position" is the balanced position of the balance beam with the commodities or articles loaded on the weighing device, what is meant by the "standard weight" is the desired weight of the commodities pre-selected from a particular weighing operation of the weighing device, such as the weight assigned to each capsule of medicine to be dispensed when the commodities to be weighed are medicine, and what is meant by the "equalizing deflection" is the deflection of a certain point of the balance beam between its no-load balanced position and its loaded-balanced position when the standard weight of commodities is loaded on the weighing device.

Additionally, the term "deficit weight," as used hereinafter, refers to the weight deficiency necessary to be supplied to bring the weight of the commodities or articles up to the "standard weight."

For an understanding of the principles of the invention, reference is made to the following description of typical embodiments thereof as illustrated in the accompanying drawings.

Figure 10:
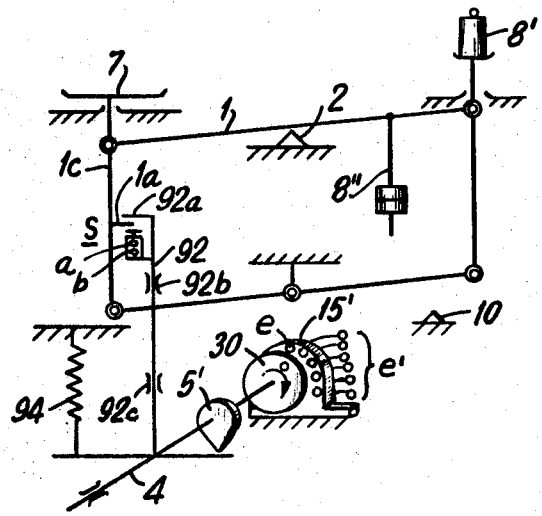
Figure 6:
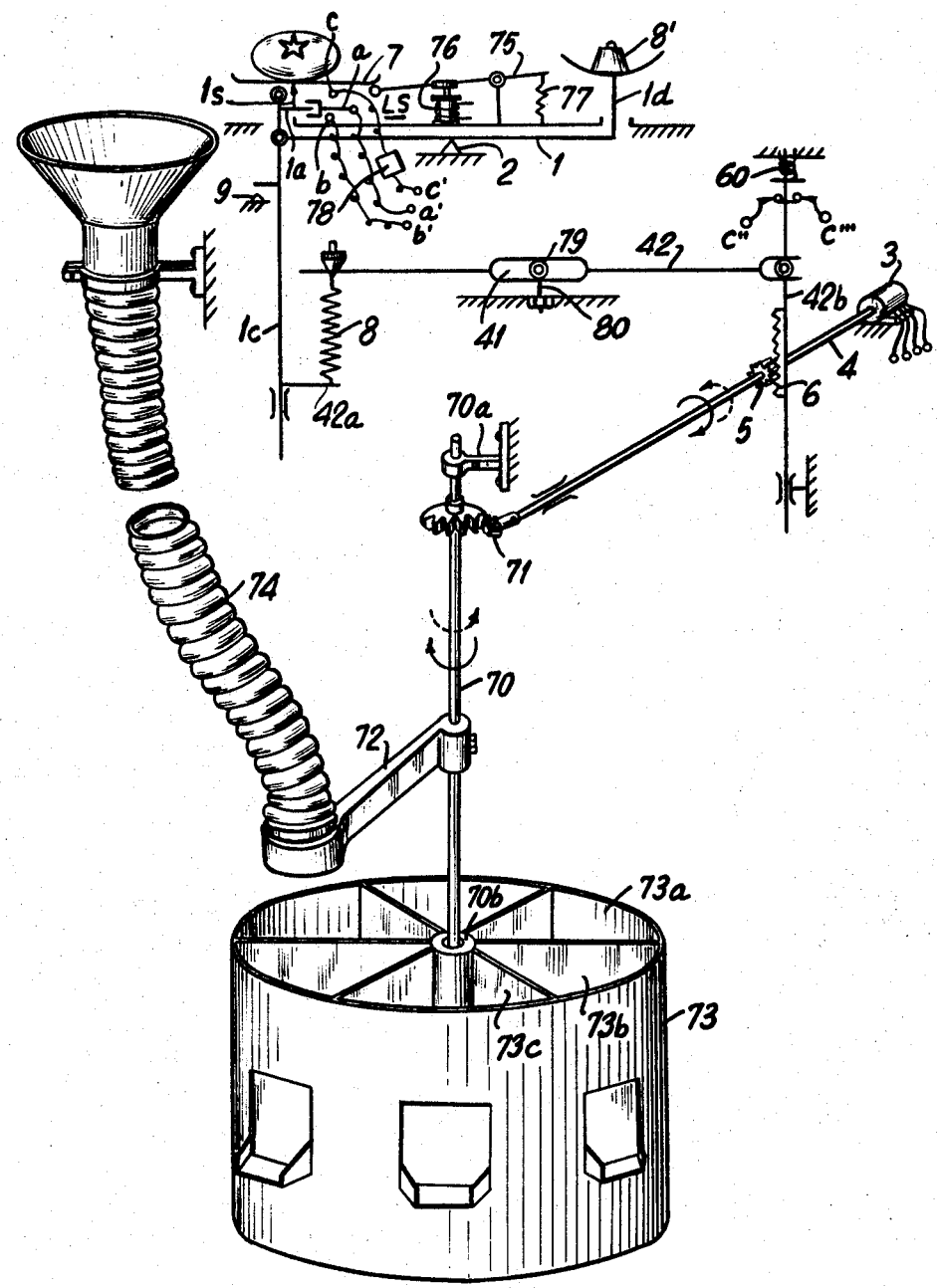
Figure 7:
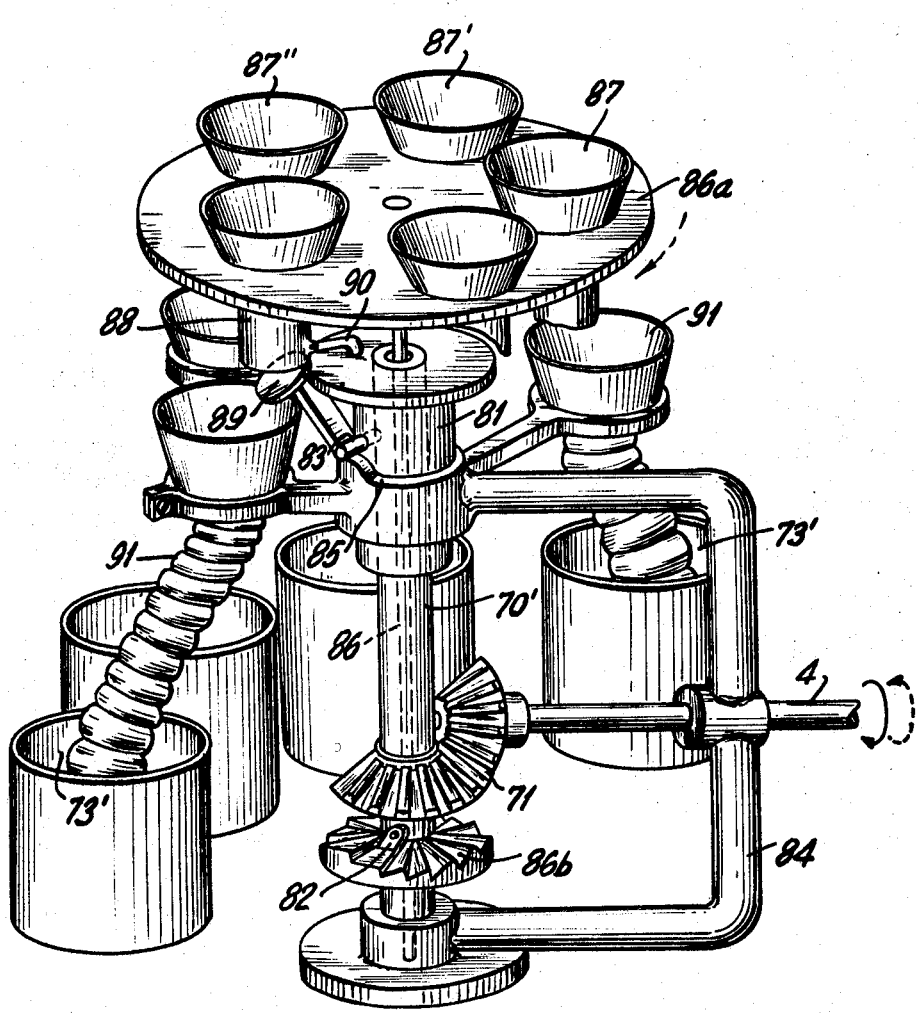
Figure 8:
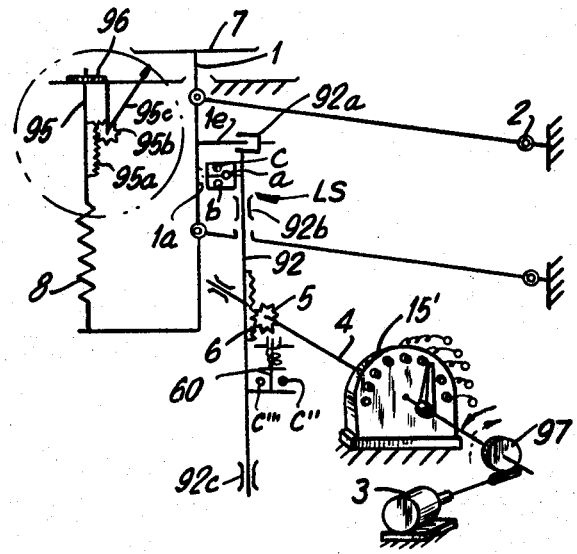
Figure 9:
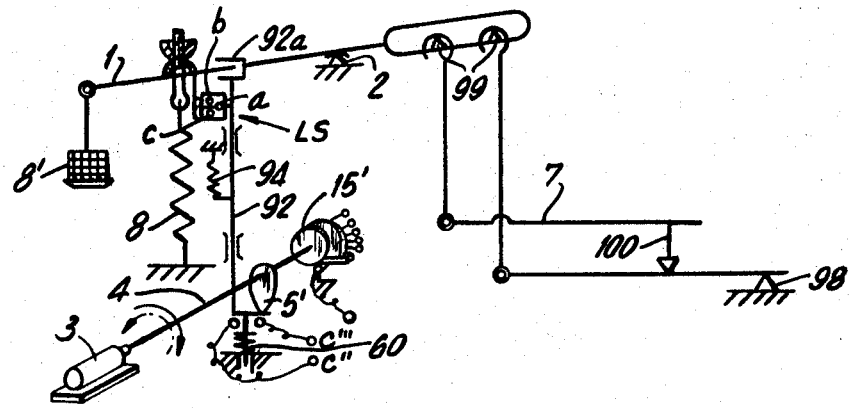
Figure 13:
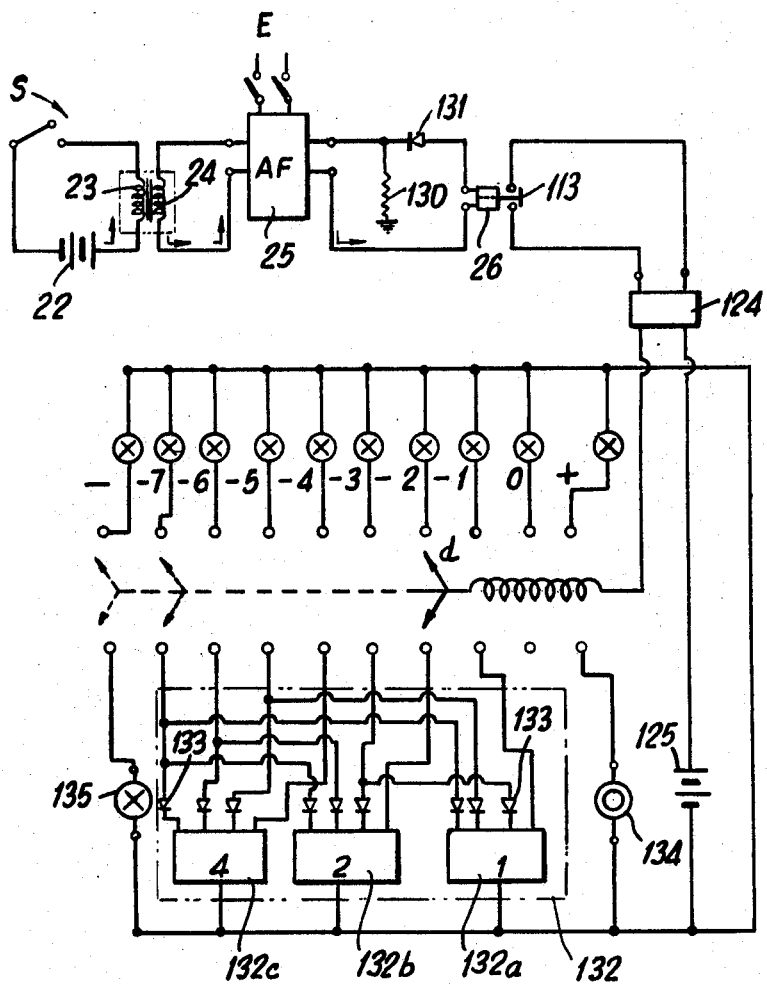
Figure 14:
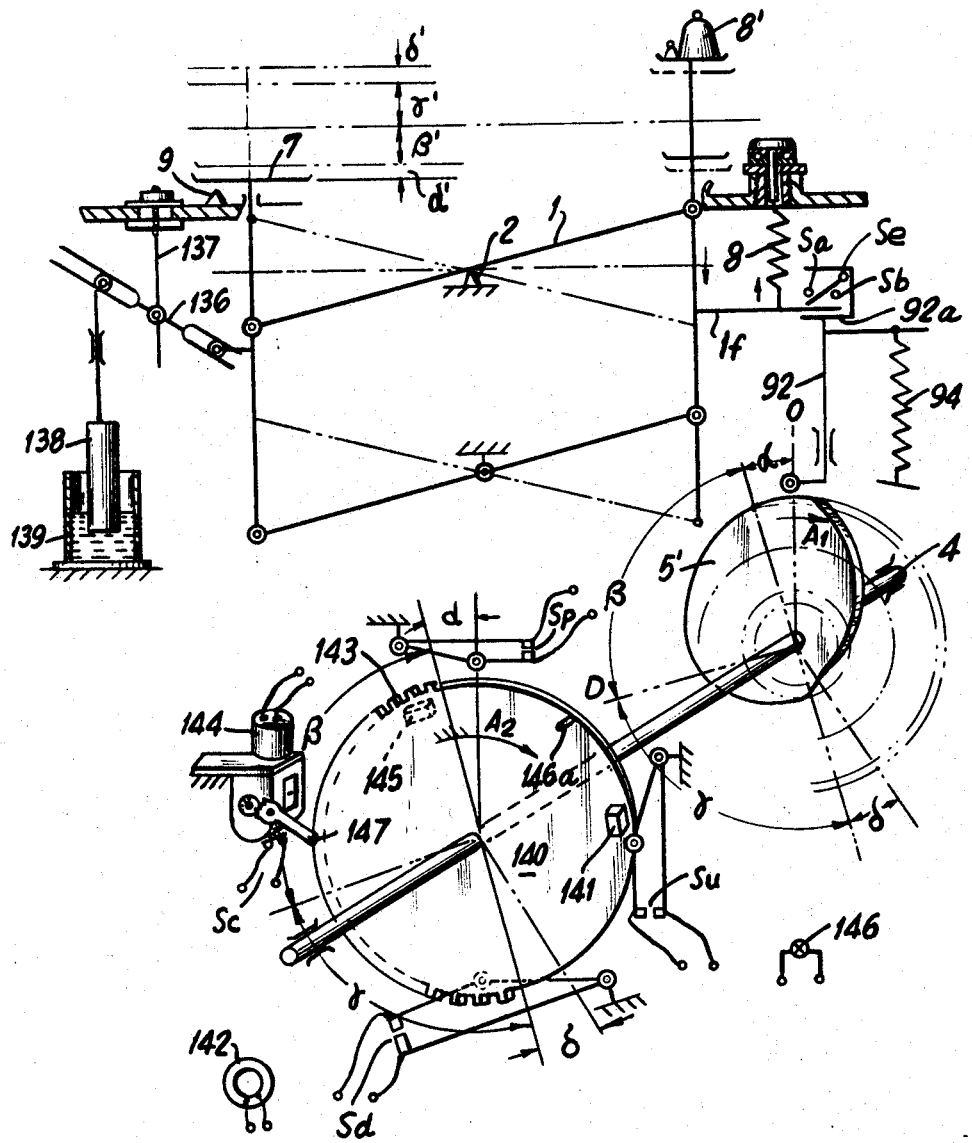
Figure 15:
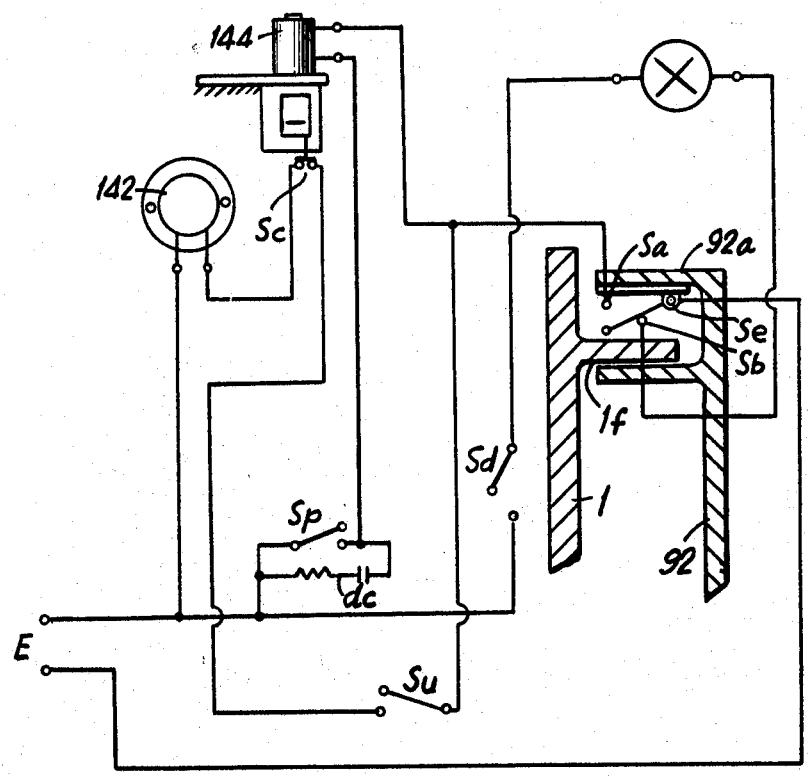
Figure 18:
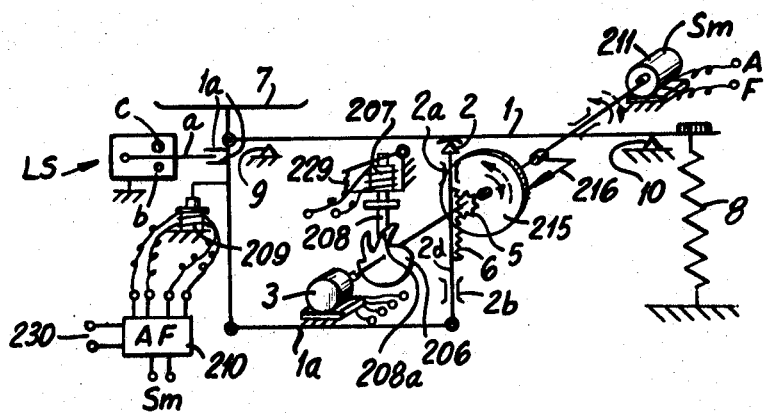
Figure 19:
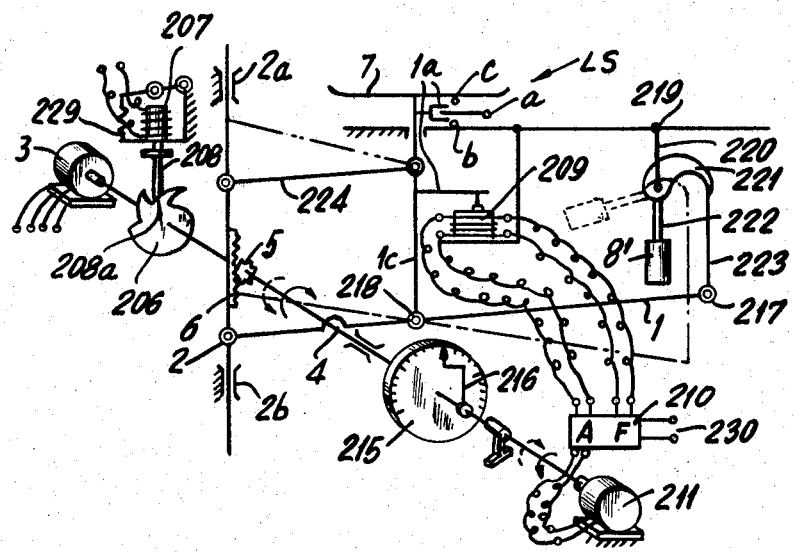

FIGS' 3 to 5 illustrate other embodiments of weighing devices usable in performing the method of the invention;

FIG. 6 is a diagrammatic illustration of an assorting device embodying the method of the invention;

FIG. 7 is a perspective view illustrating another type of assorting device embodying the method of the invention;

FIGS. 8 to 10 are diagrammatic views illustrating other embodiments of weighing devices;

FIGS. 11–A, B, and C, and FIGS. 12–A, B, and C, illustrate examples of deviation detecting means;

FIG. 13 is a partial wiring diagram of the means shown in FIGS. 11–A to 12C, illustrating control means for adding the pourable commodities to each group to bring it to the desired standard weight;

FIG. 14 is a diagrammatic illustration of another weighing device usable in performing the method of the invention;

FIG. 15 is a wiring diagram of the device of FIG. 14;

FIGS. 16–A and B are a diagrammatic illustration and a partial wiring diagram, respectively, illustrating a dispensing device usable in performing the method of the invention;

FIGS. 17–A and B are a perspective view and a vertical sectional view, respectively, of a supplementing device for use with a weighing device;

FIGS. 18 and 19 illustrate further embodiments of weighing devices; and

Figure 20:
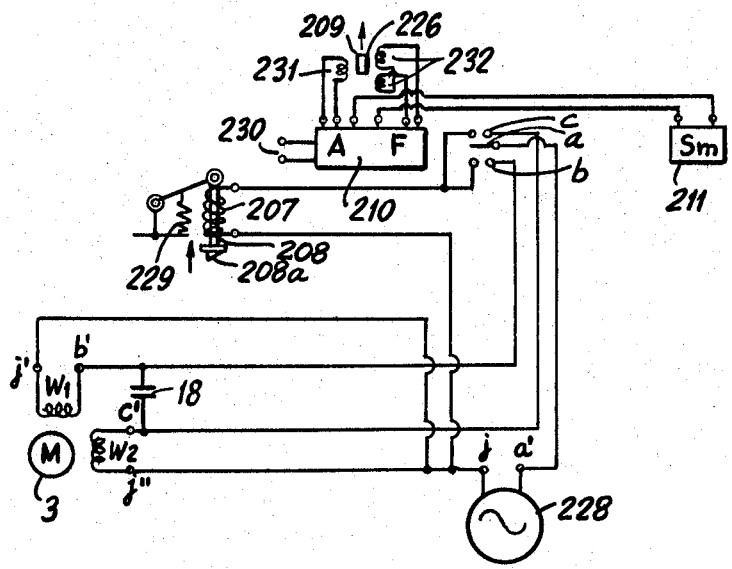

FIG. 20 is a wiring diagram of the devices shown in FIGS. 18 and 19.

At first, the procedure of dispensing pourable commodities into a number of groups of a standard weight, such as filling each of a plurality of separate bags or capsules with a quantum of desired commodities of a pre-selected weight, will be described.

Figure 1:
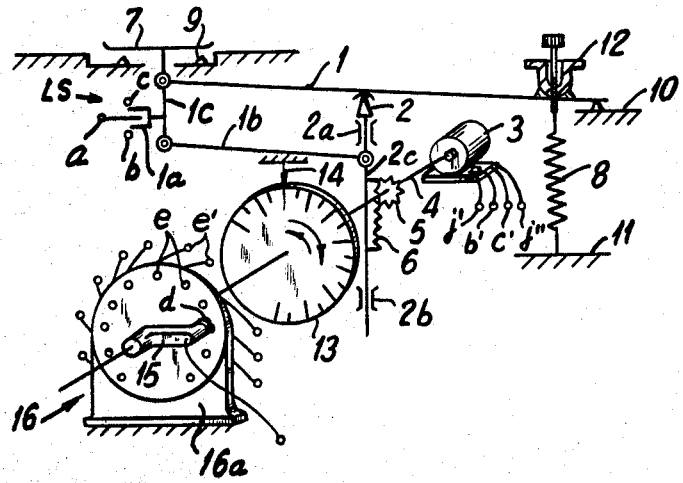
FIG. 1 is a diagrammatic illustration of a weighing device usable in performing the method of the invention.

Referring to FIG. 1, a balance beam 1 is supported at a fulcrum 2 located at the top end of a vertical bar 2c which is movable along fixed guide members 2a and 2b, and a Roberval lever 1b is connected to balance beam 1 through vertical bars 1c and 2. Vertical bar 1c is positioned at one end of balance beam 1 and provided with a scale plate 7 to receive the commodities to be weighed and with a lug 1a to actuate a movable contact a of a limit switch LS. A counterbalance spring 8 is connected to the opposite end of balance beam 1, with the lower end of spring 8 being connected to a fixed point 11 and the upper end to balance beam 1 by means of an adjusting screw 12 so as to keep scale plate 7 in a balanced position under no load. Support members 9 and 10 are provided to receive and support the impulsive force caused either by placing commodities to be weighed onto scale plate 7 or by removing the same from scale plate 7.

Scale plate 7 is spaced from support member 9 by a certain predetermined distance in the no load condition. Upon placing commodities to be weighed onto scale plate 7, the distance between scale plate 7 and support member 9 is decreased and the electric circuit between contacts a and b of limit switch LS is closed by engagement of lug 1a with the movable blade of contact a. Furthermore, upon removing commodities from plate 7, the above distance between plate 7 and support member 9 is increased beyond the value at no load, and the electric circuit between contacts $a$ and $c$ is closed by engagement of lug $1a$ with the movable blade of contact $a$.

A shaft 4 driven by a reversible motor 3 is engaged with vertical bar $2c$ through the medium of a pinion 5, secured to shaft 4, and a rack 6, secured to vertical bar $2c$, in order to shift vertically fulcrum 2 and, accordingly balance beam 1. The magnitude of the vertical displacement of fulcrum 2 of beam 1 can be easily detected by measuring the angular displacement of shaft 4. The displacement of fulcrum 2 represents the displacement of the counterbalance spring 8 as described hereinafter. A dial plate 13, having a series of graduations, is secured to shaft 4 to rotate therewith, and the angular displacement of plate 13 and shaft 4 can be read easily by means of a fixed pointer 14.

In order to detect electrically the angular displacement of shaft 4, the latter is connected to a deviation detector 16 in such a manner that a contact point $d$, provided at the free end of a rotary arm 15 secured to shaft 4, makes a direct contact with the proper one of a series of contacts $e$, which are disposed substantially along a circle on a support framework $16a$, responsive to the magnitude of the angular displacement of shaft 4. It is permissible to use framework $16a$ holding the contacts $e$ as a bearing holder for the shaft 4.

Figure 2:
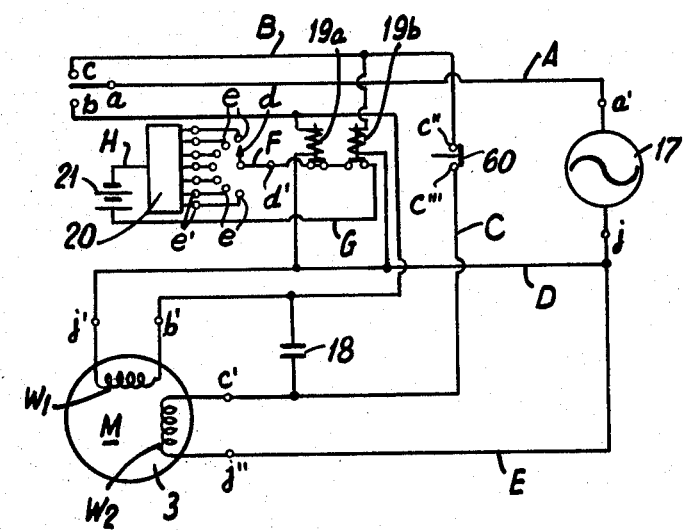
FIG. 2 is a wiring diagram of the device of FIG. 1.

FIG. 2 illustrates the electric circuit of the device of FIG. 1, wherein 17 is an electric power source, 18 a capacitor connected between a terminal $b'$ of a winding $W_1$ and a terminal $c'$ of another winding $W_2$ of the reversible motor 3, $19a$ and $19b$ relays, 20 an indicator of deviation detector 16, and 21 a D.C. power source.

The weighing operation of the device of FIG. 1 will now be described. The pourable commodities are pre-dispensed into a number of groups, having a volume roughly equivalent to the desired weight, by means of a suitable measure. Upon placing one of such pre-dispensed groups on scale plate 7, balance beam 1 rotates around its fulcrum 2 in a counterclockwise direction, as viewed from the front of FIG. 1, and the circuit between the contact $a$ and $b$ is closed by means of the downward movement of lug $1a$. Then scale plate 7 and balance beam 1 are held stationary by supporting the gravitational force, acting on the commodities, by support member 9. With contacts $a$ and $b$ closed, an operating circuit of reversible motor 3 is completed, which traces from the terminal $a'$ of power source 17 through the lead wire A, contacts $a$, $b$, terminal $b'$, winding $W_1$, terminal $j'$ and lead wire D and back to the terminal $j$ of power source 17. Accordingly, the reversble motor is rotated in a clockwise direction to lift fulcrum 2 of balance beam 1 through a transmission mechanism comprising pinion 5 and rack 6. Since scale 7 is held stationary at support member 9, as fulcrum 2 is lifted gradually responsive to the rotation of reversible motor 3, counterbalance spring 8 is elongated to cause an increase in the magnitude of the elastic force acting at the righthand end of balance beam 1 so as to effect a clockwise rotation of balance beam 1 around fulcrum 2 (as viewed from the front of FIG. 1). If the above elastic force acting at the righthand end of the balance beam is increased sufficiently to balance the gravitational force acting at the lefthand end thereof, the scale plate is going to move upward leaving the support member 9. Thus, as fulcrum 2 is further lifted, lug $1a$ is also raised to interrupt the circuit between contacts $a$ and $b$ to stop the clockwise rotation of reversible motor 3. (For the sake of simplicity, such a position of the balance beam as to cause disengagement of scale plate 7 from support member 9 and interruption of the circuit between contacts $a$ and $b$ will be referred to as the "balanced position" of the balance beam hereinafter.)

At the same time, the magnitude of the angular displacement of shaft 4, which is directly proportional to the vertical elongation of counterbalance spring 8, can be read as the number of graduations on dial plate 13 passing indicating needle 14. It is now apparent that the above number of graduations is proportional to the weight of the commodities to be weighed.

Furthermore, as shaft 4 stops rotating, contact point $d$ at the tip end of rotary arm 15 is also stopped, while keeping direct contact with a proper one of the deviation indicating contacts $e$. Thereby, the energizing circuit of indicator 20 of the deviation detector is completed, which traces from a common terminal at one side of indicator 20 through the lead wire H, the D.C. power source 21, the lead wire G, contacts of the relays $19a$ and $19b$ (to be closed under these conditions), contact $d$ of rotary arm 15, and the properly selected one of the deviation indicating contact points $e$, back to the said common terminal of the indicator 20. Thus, a proper element of indicator 20, such as a selected one of a series of indicating lamps, is energized responsive to de-energization of relays $19a$ or $19b$ previously referred to following the interruption of the circuit between contacts $a$ and $b$ of limit switch LS. In other words, if the indicating lamp representing a zero-deviation is energized, it means that the weight of the object on scale plate 7 is equal to the desired value (for the sake of simplicity, such a position of the deviation detector as to energize the indicating element representing a zero-deviation will be referred to hereinafter as the "equalized position" of the deviation detector), while, when any other indicating element, such as a lamp, of the indicator is energized, it means that the weight of the commodities on scale plate 7 is either in excess of or short of the desired standard weight by the degree represented by the indicating element, as will be described in further detail hereinafter.

Upon removal of the commodities to be weighed, the balance of forces acting on both ends of balance beam 1 is lost, and balance beam 1 is rotated clockwise around its fulcrum 2 by the elastic force of the elongated counterbalance spring 8 to close the circuit between contacts $a$ and $c$ by the upward movement of the lug $1a$. Thereby, the circuit of reversible motor 3 effective to rotate it in a counterclockwise direction is energized, which circuit traces from terminal $a'$ of power source 17 through lead wire A, contacts $a$, $c$, lead wire B (a switch 60 is not used in this embodiment), terminal $c'$ winding $W_2$, terminal $j''$ of reversible motor 3, and the lead wire E, and back to the terminal $j$ of power source 17. Thereby, the reversible motor is rotated in a counterclockwise direction to lower fulcrum 2 of the balance beam 1. Since the right-hand end of balance beam 1 is held stationary at support member 10 by the elastic force of counterbalance spring 8 under these conditions, as fulcrum 2 is lowered, the lefthand end of balance beam 1 and, accordingly, scale plate 7, are also lowered until the distance between scale plate 7 and support member 9 is reduced to the aforementioned initial balanced distance and the electric circuit between contacts $a$ and $c$ is interrupted. Thus, the initial balanced position of balance beam 1 is restored.

It should be noted here that the limit switch LS having contacts $a$, $b$ and $c$, in the above embodiment, can be replaced by any other suitable type of device, such as a switching device including a photoelectric cell. In the case of a photoelectric cell switch, mechanical inertia inherent to the limit switch contacts, such as $a$, $b$ and $c$, can be eliminated and the accuracy in the weighting operation can be increased accordingly.

In FIG. 2, $d'$ and $e'$ designate terminals on the deviation detector connected to the rotary arm contact $d$ and deviation detecting contacts $e$ respectively.

FIG. 3 illustrates another weighing device which is characterized in that a counterweight $8'$ is used in conjunction with a conuterbalance spring 8 at the same end of a balance beam 1, and that a cam $5'$ and a cam follower bracket $6'$ cooperating with cam 5 are used instead of the combination of pinion 5 and rack 6 of the device of FIG. 1, in order to allow unidirectional continuous rotation of motor 3 and vertical reciprocation of fulcrum 2 responsive to such unidirectional rotation. Furthermore, in the weighing device of FIG. 3, the deviation indicating circuit is energized by a device consisting of a switch, induction coils, and a clutch means, without interrupting the rotation of the motor 3. FIG. 3–A shows the electrical control circuit of the weighing device illustrated in FIG. 3.

In the device as shown in FIG. 3, weight member 8′, which is substantially lighter than the desired weight of commodities, is placed on a plate connected to the righthand end of balance beam 1, as viewed from the front of FIG. 3, prior to placing the commodities to be weighed onto scale plate 7. Then the righthand end of balance beam 1 is lowered, and held stationary by support member 10. Accordingly, as cam 5′ secured to shaft 4 is rotated unidirectionally by means of driving motor 3, vertical rod 2c and hence fulcrum 2 of balance beam 1 are vertically reciprocated in accordance with the configuration of cam 5′. Thereby, the vertical rod at the lefthand end of the balance beam, and hence scale plate 7, are also vertically reciprocated, causing the circuit between contacts a and b of limit switch S to be closed and opened, when scale plate 7 reaches certain positions relative to support member 9, by means of the engagement between switch S and lug 1a extending from vertical rod 1c. At the same time, a proper deviation indicating contact for the no-load condition, say $e_0$, is selected out of the series of deviation indicating contacts e by means of a deviation detector to be described later. Upon closing the circuit, between contacts a and b, a current is fed from the D.C. power source 22 through a primary coil 23 of an induction device and a voltage is induced across the terminals of a secondary coil 24 of the induction device. The voltage thus induced across the secondary coil 24 is amplified by an amplifier 25 to energize an electromagnet 26 of a clutch means K. With electromagnet 26 being energized, deviation indicator 20 gives an indication of the deviation of the weight of the commodities on scale plate 7 from the desired weight, namely a deviation equal to the entire desired weight under the above no-load condition.

If commodities substantially heavier than counterweight 8′ are placed on scale plate 7 when the latter is at the lowest position of its vertical reciprocation stroke, then the gravitational force acting on the commodities to be weighed is received by support member 9 to hold stationary both scale plate 7 and vertical rod 1c. Accordingly, as shaft 4 and hence cam 5′ are rotated, fulcrum 2 is raised and the righthand end of balance beam 1 is also forced to move upward, while causing elongation of counterbalance spring 8, until the composite force acting at the righthand end of beam 1, which is the sum of gravitational force acting on counterweight 8′ and the elastic force of counterbalance spring 8 due to its elongation, is increased sufficiently to balance the gravitational force acting on the commodities on scale plate 7, with respect to fulcrum 2 of the balance beam 1. Thus, the balanced position of balance beam 1 is obtained.

After such a balanced position of beam 1 is attained, both ends of balance beam 1 are raised in parallel, in accordance with the rotation of shaft 4 and cam 5′, in order to close the circuit between contacts a and b of limit switch S. With the contacts of limit switch S closed, deviation indicator 20 is energzed to indicate the selected one, say $e_n$, of the series of deviation indicating contacts e as will be described hereinafter. Since the angular difference of the deviation indicating contact $e_n$ from a preselected reference contact $e_0$ can be easily made proportional to magnitude of the angular displacement of shaft 4, and, accordingly, to the elongation of counterbalance spring 8, the weight of the commodities on scale plate 7 may be detected by means of such angular difference. For instance, if the weight of the commodities on scale plate 7 at a certain moment coincides with the desired weight, then deviation indicator 20 will give a zero-deviation indication responsive to the selection of the proper deviation indicating contact $e_0$. On the other hand, if the weight of the commodities placed on scale plate 7 is different from the desired weight by a certain amount, then another contact $e_n$ is selected so as to indicate the weight difference properly.

Details of the clutch means actuated by electromagnet 26 and of the deviation detector or the selector of deviation indicating contacts will be described hereinafter. It should be noted here that the induction means are so adapted as to energize electromagnet 26 responsive only to closing operation of contacts a and b of limit switch S, and to de-energize electromagnet 26 upon completion of the closing operation. Thus the upward movement of fulcrum 2 after contacts a and b of limit switch S are closed does not affect the indication of the deviation.

It is preferable to maintain the indication of the deviation for a suitable period of time by means of a suitable time delay means. In FIG. 3, 27 is a shifter having an armature cooperating with electromagnet 26, 28 a shaft pivotally supporting shifter 27, 29 a collecting roller, and 30 a collecting ring directly connected to the contact d. The weighing device of the type shown in FIG. 3 is suitable to carry out smooth and efficient automatic weighing and dispensing operation, particularly such operations in a continuous conveyor system. Unless a load is placed on scale plate 7, the device idles.

FIG. 4 illustrates another weighing device according to the invention, wherein the principles of the present invention are applied to a spring balance of conventional type. A conventional balance is enclosed in a fixed outer casing 31 which has a support member 9 for receiving scale plate 7, and there are a dial plate 14, an indicating needle 13, a balance beam 1 and a Roberval lever 1b placed in an inner casing 31a, which is in turn held in the fixed outer casing 31 in a vertically slidable manner by means of rollers 32.

In the device shown in FIG. 4, cam 5′ mounted on shaft 4 driven by reversible motor 3 (not shown) causes vertical reciprocation of inner casing 31a together with vertical rod 2c, fulcrum 2 of the balance beam 1, dial plate 14 and retainer 11 of the counterbalance spring 8, at a certain predetremined rate, say at a uniform speed of $V_1$. Then, when commodities are placed on the scale plate, the lower end of counterbalance spring 8, which is fixed to Roberval lever 1b, at a point intermediate to the fulcrum and the extreme lefthand end thereof as viewed from the front of FIG. 4, is moved at a speed slower than the speed of the inner casing 31a. Thereby, the counter balance spring 8 is gradually elongated as inner casing 31a is raised, while causing an increase in the magnitude of the elastic force acting on Roberval lever 1b in a vertically upward direction, until such upward elastic force is balanced with the gravitational force acting on the commodities to be weighed on scale plate 7. Furthermore, it can be seen easily that vertical rod 2d, connected to the extreme righthand end of balance beam 1 as viewed from the front of FIG. 4, is moved at a speed faster than the speed of casing 31a. Thereby, pointer 13 is rotated by means of the engagement between a pinion, secured to the rotary shaft of pointer 13, and a rack secured to vertical rod 2d.

Thus, with a limit switch LS and the reversible motor 3 similar to those described in detail with regard to FIG. 1, balance beam 1 is brought into a balanced position indicative of the weight of the commodities placed on scale plate 7, and the weight thereof can be shown on dial plate 14 as in the case of conventional spring balance. It is also permissible to use a two contact limit switch S as shown in FIG. 3, instead of the three contact limit switch LS, in the embodiment of FIG. 4.

A deviation indicating device in the weighing device of FIG. 4 consists of an indicating needle 33, secured to shaft 4, and a dial plate 34, instead of the combination of a rotary arm and a series of deviation indicating contacts $e$ in the weighing devices of FIGS. 1 and 3.

Figure 5:
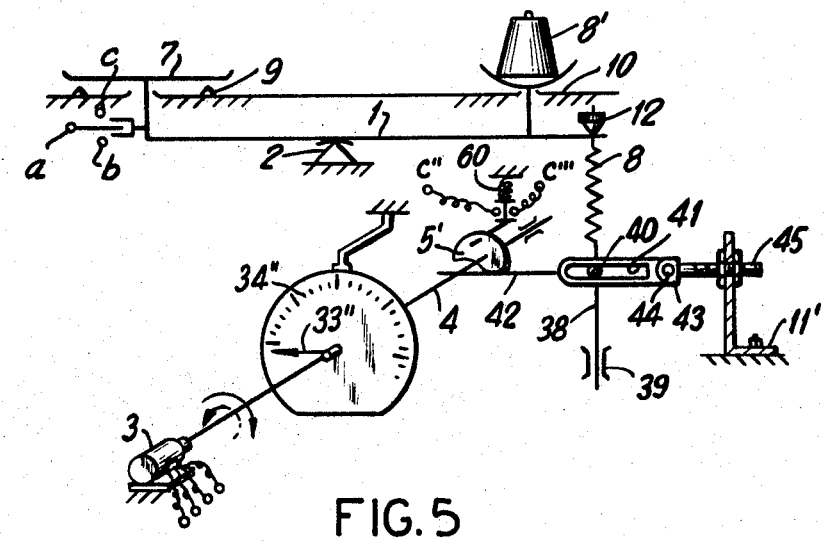

FIG. 5 illustrates another weighing device in which a balance beam 1 is supported by a fixed fulcrum 2, instead of a movable fulcrum as shown in the aforementioned weighing devices, and both a counter weight 8' and a counterbalance spring 8 are placed on one end portion of the balance beam 1 with respect to fulcrum 2 thereof, say the righthand end portion thereof as shown in the figure. In the device of FIG. 5, an external force is applied to the same end of the balance beam connected to the counter balance spring, by means of a cam 5' acting through such spring.

Furthermore, in this device, the ratio of the linear displacement of counterbalance spring 8 to the angular displacement of cam 5' is made variable. If the commodities to be weighed comprise granular or powder particles of uniform size, it is convenient to express the deviation of the weight by multiples of a unit weight representing the weight of one such uniform size particle or multiple thereof, instead of deviation in absolute weight, such as so many grams. The weighing device of FIG. 5 is provided not only with means for giving such indication of the deviation of weight in terms of multiples of a certain predetermined unit, but also with means for adjusting the magnitude of such predetermined unit weight in accordance with the kind of the commodities to be weighed.

In order to facilitate the modification of the magnitude of such unit weight, a vertical rod 38 is fixed at the free end of the counterbalance spring 8 and guided by a vertical guide 39 so as to allow vertical movement thereof, and a roller 40, fitted in a grooved portion 41 of a horizontal lever 42, is rotatably mounted on a certain point of vertical rod 38 to link together vertical rod 38 and horizontal lever 42. Horizontal lever 42 is hinged to a threaded rod 45 for pivoting around a pintle 44 of a hinge 43, and the threaded rod 45 in turn mounted on a fixed bracket, by means of nuts mating with the thread on the rod, in such a manner that rod 45 and accordingly pintle 44 may be shifted in a horizontal direction by turning the nuts. Thus, the ratio between the distance from the contact point of lever 42 with cam 5' to roller 40, and the distance from roller 40 to pintle 44, can be adjusted by moving threaded rod 45 horizontally by turning the nuts fastening rod 45 to the fixed bracket. Thus, the magnitude of the elongation of counterbalance spring 8 per unit angular displacement of cam 5' can be adjusted at will within a certain range, so as to bring about the modification of aforementioned unit weight per one graduation of a dial plate 34''.

It is apparent now to those skilled in the art that the weight of the commodities to be weighed, or the deviation of the same from the desired weight, can be detected by the magnitude of the angular displacement of shaft 4 and indicated on dial plate 34'' by an indicating pointer 33'' in a manner similar to any of the methods described with reference to FIGS. 1 to 4.

In order to calibrate the graduations of the dial plate and thread rod 45, commodities of desired standard weight are first placed on scale plate 7 and, when contacts $a$ and $b$ are opened as the balanced position of the balance beam is obtained by means of the rotation of shaft 4 driven by the reversible motor, pointer 33'' is set at the zero-deviation point of dial plate 34''. Then a certain amount of commodities, having a weight corresponding to multiples of the predetermined unit weight, is added to or removed from scale plate 7, and the position of threaded rod 45 is adjusted by turning the nuts, which fasten the rod to the fixed bracket, back and forth so that pointer needle 33'' indicates the graduation corresponding to such multiple of the predetermined unit weight.

It is preferable to provide a series of suitable graduations on rod 45 to give an indication of the ratio between the angular rotation of cam 5' and the corresponding linear displacement of counterbalance spring 8, or of the value of the unit weight per graduation on the dial plate.

In order to ensure the return of cam 5' after the removal of the commodities to be weighed from scale plate 7, in the device of FIG. 5, another limit switch 60, consisting of contacts $c''$ and $c'''$ which are inserted in series into the circuit of the reverse winding $W_2$ of reversible motor 3 as shown in FIG. 2, is provided. In other words, in the device of FIG. 5, the rotation of motor 3 in the reverse direction, following the removal of the commodities from scale plate 7, is interrupted by the action of limit switch 60 even when contacts $a$ and $c$ are still kept closed, and the weighing device becomes ready for the next weighing operation.

The application of the present invention to assortment of a plurality of individual articles by weight, such as assortment of applies by weight thereof into a number of groups, will now be described.

FIG. 6 shows an example of devices for assorting articles by weight according to the invention, in which a counterbalance spring 8 is connected to the same end of balance beam 1 as that which receives the gravitational force acting on the article to be weighed. The article to be weighed and assorted is placed on scale plate 7 connected to one end of balance beam 1 through vertical rod 1c, while placing a counterweight 8', which is slightly lighter than the lightest one of the articles to be weighed, on another scale plate, connected to the opposite end of balance beam 1 with respect to fulcrum 2 through another vertical rod 1d, so that the gravitational force acting on the article to be weighed is received by fixed support member 9. Scale plate 7 is hinged at the end of vertical rod 1c so as to be turned over in a counterclockwise direction away from a stopper 1s.

The downward movement of vertical rod 1c, following the placement of the article to be weighted onto scale plate 7, closes the circuit between contacts $a$ and $b$ to cause rotation of reversible motor 3 in a clockwise direction, as described in connection with FIG. 1. Thereby, a vertical rod 42b hinged to a horizontal lever 42, which is supported by a movable fulcum 80 to transmit the vertical movement of rod 42b to counterbalance spring 8, is moved downward, causing rotation of lever 42 around fulcrum 80 in order to elongate counterbalance spring 8 until the composite force, of the gravitational force acting on the article to be weighed and the elastic force due to elongation of spring 8, is balanced with the gravitational force acting on counterweight 8'. Then balance beam 1 is brought into its balanced position. Upon attainment of the balanced position of balance beam 1, the circuit between contacts $a$ and $b$ is opened to stop rotation of shaft 4 and, accordingly, elongation of counterbalance spring 8 through vertical rod 42b and horizontal lever 42.

The annular displacement of shaft 4, from the initial no-load balanced position to the balanced position with the article placed on scale plate 7, is proportional to the weight of the article provided that the weight of counterweight 8' is constant. Accordingly, if a vertical shaft 70 of the assorting device is rotated responsive to the rotation of shaft 4, by means of gearing means 71, the outlet of a flexible chute 74 is brought to a selected one of a series of classified sections 73a, 73b, 73c . . . of an assorting chamber 73. This is effected by means of the rotation of a guide arm 72 secured to vertical shaft 70, as shown in FIG. 6. Thus, the article weighed by the weighing device is simultaneously assorted and, on tilting scale plate 7, is delivered into the selected section of receiving chamber 73 in accordance with the magnitude of the angular displacement of shaft 4. In FIG. 6, 70a and 70b are bearings of vertical shaft 70.

The operation of turning over or tilting scale plate 7 to forward the weighed article to flexible chute 74 can be, for instance, achieved by means of a lever 75 actuated by an electromagnet 76 which is energized when the circuit between contacts *a* and *b* of limit switch LS is closed. Electromagnet 76 is placed on one side of lever 75 with regard to the fulcrum thereof, while a spring 77 is connected to the lever on the opposite side of its fulcrum in order to exert an elastic force on the lever so as to rotate it in a clockwise direction around the fulcrum. During the period when the article is being weighed, electromagnet 76 is energized to pull lever 75 so as to rotate it in a counterclockwise direction toward the electromagnet and hold the extreme left hand side of the lever 75 (as viewed in FIG. 6) below scale plate 7 with a suitable space between them. Upon completion of weighing or upon attaining the balanced position of the balance beam 1, the circuit between contacts *a* and *b* is opened to de-energize electromagnet 76 and allow clockwise rotation of lever 75 due to the elastic force of spring 77. Thereby the extreme lefthand end of lever 75 strikes the bottom of scale plate 7 causing plate 7 to rotate in a counterclockwise direction around the tip end of vertical rod 1c where plate 7 is pivotally supported. Thereby, the article on the plate is transferred leftward into a funnel-shaped receiver at the top end of flexible chute 74. It is preferable to hinge scale plate 7 atop vertical rod 1c in such a manner that the center of gravity of plate 7 is always kept on the side of stopper 1s, with regard to vertical rod 1c of the weighing device, so that the scale plate may return toward support 1s by itself without any additional outside force.

With the article on scale plate 7 thus removed, balance beam 1 rotates in a clockwise direction to close the circuit between contacts *a* and *c*, and reversible motor 3 is energized to bring balance beam 1 back to its no-load balanced position when motor 3 is de-energized by opening limit switch 60.

In order to avoid any error due to the time taken by the article to travel through the flexible chute 74, it is preferable to insert a suitable time delay relay 78 in series with the contact *c* while advancing the operative position of the limit switch 60 accordingly.

In order to allow modification of the ratio between the magnitude of angular displacement of shaft 4 and the degree of elongation of counterbalance spring 8, lever 42 is provided with a grooved portion 41 to receive therein a fulcrum roller 79 secured to the top of a vertical rod 80 which is movable in a horizontal direction. Thus, by means of adjusting the position of vertical rod 80, the degree of elongation of counterbalance spring 8 and, accordingly, the selection of a proper section of assorting chamber 73 can be made for various types of articles to be weighed and assorted.

It is also permissible to rotate assorting chamber 73 instead of shifting the outlet opening of flexible chute 74. In the embodiment shown in FIG. 6, arm 72 serves as an indicator of deviation of the weight of the article being weighed from a preselected reference weight, in a manner similar to deviation detectors in the preceding examples. A separate deviation detecting means can be provided on shaft 4, if so desired.

FIG. 7 illustrates another assorting device according to the invention, wherein a vertical hollow cylinder 70' is rotated, responsive to angular displacement of horizontal shaft 4, through gearing 71 consisting of a couple of bevel gears. A flanged sleeve 81 is fitted to the upper end of hollow cylinder 70' in such a manner that sleeve 81 may rotate in conjunction with cylinder 70', while allowing vertical reciprocation due to the engagement between a pin 83, secured to the outer surface of the sleeve, and a cam surface 85 formed on the upper end of the upper bearing member of framework 84. A pawl 82 is pivoted to the lower part of hollow cylinder 70'. An inner shaft 86 is placed within hollow cylinder 70' along the axial center line thereof, and a rotary turn table 86a is secured to the top end of shaft 86 while a ratchet 86b is secured to the lower end portion of shaft 86 in such a manner that shaft 86 and, accordingly, turn table 86a may be rotated in a clockwise direction only during the counterclockwise rotation of horizontal shaft 4, as viewed from the lefthand side of FIG. 7. The lower end of shaft 86 is suitably supported by a lower bearing member of the framework 84.

A number of funnels 87, 87', 87", etc. are disposed on the turn table at a uniform interval along the circumference thereof, as shown in the figure. A lid 89 is hinged to the lower narrow cylindrical portion 88 of each funnel so as to close and open its outlet opening. An operating lever 90 is provided on each of the lids 89 in order to operate simultaneously all the lids of the funnels secured to turn table 86a, by means of simultaneous engagement between operating lever 90 and a flange portion of sleeve 81, which is reciprocated vertically responsive to the rotation of hollow cylinder 70'. The configuration of cam surface 85 is so selected as to open lids 89 of the funnels only at the very end period of the counterclockwise rotation of shaft 4, and close them during the rest of the rotation of shafts 4 and 86. Adjacent to each outlet of the lower narrow cylindrical portion 88 of the funnels, a chute 91 is placed so as to receive articles coming out of the funnel, and a separate individual assorting container 73' is placed adjacent to the lower end of each chute 91 to receive articles therefrom.

With the device of FIG. 7, an article to be assorted is transferred to one of the funnels on turn table 86a, say funnel 87, upon completion of the weighing operation as described in the foregoing references to the device of FIG. 6. Then horizontal shaft 4 is rotated in a counterclockwise direction to bring about the initial balanced position of the weighing device, causing rotation of turn table 86a, and the magnitude of the angular displacement of turn table 86a is directly proportional to that of horizontal shaft 4 and, accordingly, to the degree of elongation of the counterbalance spring of the weighing device, such as spring 8 of FIG. 6. Therefore, when the article is released from the funnel wherein the article is transferred, say funnel 87, at the end of the counterclockwise rotation of horizontal shaft 4, it is sorted into a proper assorting container 73' in accordance to the weight of the article itself.

In each of the aforementioned weighing devices, balance beam 1 is brought into its balanced position by applying an external force directly to the balance beam after commodities or an individual object to be weighed are placed on the scale plate. However, in the weighing devices to be described hereinafter, when an article to be weighed is placed on scale plate 7, movement of balance beam 1 is at first restrained by supporting the unbalanced forces in the balance beam by a limiting rod 92, instead of by support member 9 as in the preceding weighing devices. Thereafter, an external force is applied to the limiting rod through suitable means, such as a combination of a pinion and a rack, in order to shift the balance beam to its balanced position by increasing the counterbalance force. Such counterbalance force can be increasced by, for example, elongating a counterbalance spring. The desired weight of the article to be weighed can be detected by measuring the displacement of the limiting rod or the angular displacement of a pinion from its initial no-load balanced position to the on-load balanced position thus attained.

FIG. 8 shows an example in which an article to be weighed is placed on scale plate 7 secured atop a vertically arranged balance beam 1, and the gravitational force acting on the article is supported by a limiting rod 92 by virtue of the engagement between an arm 1e, extending horizontally from the balance beam 1, and a latch member 92a, secured to the top end portion of limit rod 92. Rod 92 is provided with al imit switch LS having contacts *a*, *b*, *c*, a rack 6 engaged with a pinion 5 secured to a horizontal shaft 4 driven by a reversible motor 3, and another limit switch 60. A counterbalance spring 8 has its lower end connected to the lower end of balance beam 1, as shown in the figure, while the upper end 95 of spring 8 is secured to a fixed point of the weighing device by means of an adjustable nut 96. The initial bias of spring 8 can be set at a desired value within a certain range by turning nut 96. A rack 95a is secured to the portion 95 of spring 8 so as to be engaged with a pinion 95b. The initial bias set on the spring 8 is indicated by the deflection of an indicator 95c.

Pinion 5 and, accordingly, shaft 4 are actuated by motor 3 through a reducing gear 97. In the weighing device shown in FIG. 8, reversible motor 3 acts not only as a means for controlling the counterbalance force, say the elastic force of spring 8, but also as a support means to hold scale plate 7 against a gravitational force acting on commodities or an article placed thereon. In other words, the braking force generated in motor 3 takes the place of support 9 of the preceding weighing devices described with reference to FIGS. 1 to 6. The circuit related to a deviation detector 15' will be described later.

With the weighing device shown in FIG. 8, when an article to be weighed is placed on scale plate 7, the gravitational force acting on the article is at first supported by the lower element of latch member 92a secured atop limiting rod 92, and the circuit between contact a and b of limit switch LS is closed due to the mechanical engagement between an arm 1a, extending from balance beam 1, and limit switch LS, as illustrated in the figure. The control circuit of motor 3 is such that, upon closing the circuit between contacts a and b, motor 3 is rotated to drive shaft 4 so as to move limiting rod 92 downwards. Thus, spring 8 is gradually elongated until the elastic force of the spring is balanced with the gravitational force acting on the article, namely with the weight thereof. When rod 92 arrives at the balanced position, the engagement between arm 1a and limit switch LS is released to open the circuit between contacts a and b, and rotation of motor 3 and shaft 4 is stopped. The magnitude of the angular displacement of shaft 4 from its initial balanced position at no-load and said balanced position with the article on scale plate 7 gives the deviation of the weight of the article from the bias weight preset on counterbalance spring 8, which can be easily detected through deviation detector 15', as will be described hereinafter.

Upon removal of the article from scale plate 7, the circuit between contacts a and c is closed to drive the motor so as to raise balance beam 1 back to its no-load balanced position and, as soon as beam 1 reaches the no-load balanced position, the contacts of limit switch 60 are opened to stop rotation of motor 3 and shaft 4 in the same manner as in the preceding weighing devices.

FIG. 9 shows another weighing device in which balance beam 1 is directly supported by latch member 92a of limiting rod 92 upon placing an article on scale plate 7. The standard or desired weight is applied to beam 1 by means of a counterbalance weight 8' at one end thereof. When the composite effect of the elastic force of balance spring 8 and standard weight 8' is balanced with the load mounted on scale plate 7, the balance beam is brought into a balanced position in the same manner as described hereinbefore. In the figure, 98 is a fixed support member of scale plate 7, 99 double gravity points to transmit the gravitational force acting on the article to be weighed to beam 1, and 100 a movable support of scale plate 7. With the mechanism of FIG. 9, it has been well known that the conditions for balancing beam 1 with regard to fulcrum 2 are not affected substantially by the choice of positions on scale plate 7 where commodities or an article to be weighed are placed. The deviation of the weight of the article to be weighed is detected and indicated by means of limit switches LS and 60, motor 3, horizontal shaft 4, cam 5', contacts of deviation detector 15', etc. in the same fashion as that of preceding weighing devices.

FIG. 10 shows another embodiment similar to the one shown in FIG. 3 and suitable for continuous weighing in which one weighing cycle corresponds to one unidirectional rotation of the shaft 4.

In the device shown in FIG. 10, under no-load conditions, latch member 92a and arm 1a extending from vertical member 1c of the balancing means are engaged with each other throughout the above weighing cycle. On the other hand, upon placing an article to be weighed while latching member 92a is at its uppermost position of its vertical reciprocation, responsive to rotation of cam 5', vertical member 1c is lowered to close the circuit between contacts a and b of limit switch S secured to the lower element of latch member 92a. As rod 92 is lowered responsive to the rotation of cam 5', the member 1c of the balancing means 1 is also lowered while keeping the circuit of contacts a and b of limit switch S closed by the mechanical engagement between arm 1a and the lower element of latch member 92a. However, when beam 1 reaches its balanced position, the mechanical engagement between arm 1a and the lower element of latch member 92a is released to open the circuit between contacts a and b. Then arm 1a is brought into mechanical engagement with the upper element of latch member 92a.

At the time of the above closing and opening operations of the circuit of contacts a and b of limit switch S, a first pulse and a second pulse are induced respectively across secondary coil 24 of induction means shown in FIG. 3A. The weight of the article to be weighed can be determined by measuring the time between the first and second pulses, which time is proportional to the magnitude of the angular displacement of shaft 4 from its zero-point to the above balanced point.

FIGS. 11–A to 11–C show the construction of a deviation detector for the selection of contacts of a deviation indicator, which can be used in a weighing device including a reversible motor 3 and a shaft 4 rotated in both directions, such as those illustrated in FIGS. 1, 4, 5, 6, 8 and 9. FIGS. 12–A to 12–C show the construction of a detector similar to the preceding one, which detector can be used in weighing devices including a unidirectionally rotatable shaft 4, such as those illustrated in FIGS. 3 and 10.

In FIG. 11–A, shaft 4 is supported by bearings 110 and 111, and to the shaft is secured an insulating disk 112 having a contact point d. A conductive surface 113 on the circumference of insulating disk 112 is in contact with a conductive roller 29 and connected to the contact point d through a lead wire 114 (FIG. 11–B). A clutch element having teeth or serrations 115 is secured to the hub of disk 112 at the righthand side thereof as viewed from the front side of FIG. 11–A. Another insulating disk 117, having a plurality of contact points e thereon, is loosely fitted to shaft 4 in a slidable manner, and another clutch element having serrations 116 to engage with serrations 115 is secured to insulating disk 117 at the lefthand side thereof, as viewed from the front of FIG. 11–A, in such a manner that, whenever serrations 115 and 116 are intermeshed, one of the contact points e is brought into direct contact with contact point d secured to disk 112. A compression coil spring 118, inserted between bearing 111 and disk 117, biases insulating disk 117 leftwards to bring about tight and stable engagement of serrations 115 and 116. A shifter arm 119 has one end connected to the righthand side of the hub of insulating disk 117, and the opposite end of shifter arm 119, made of magnetic material, is inserted into a solenoid 26 which pulls arm 119, and, accordingly, disk 117 rightwards whenever energized so that contact points d and e are separated from each other.

The insulating disk 117 is sector-shaped and provided with a vertical leg 120. A spring 122 (FIG. 11–C) is provided between leg 120 and a bracket 121 fixed to the base plate of the device on that side of leg 120 which is opposite to the direction of rotation of shaft 4, for increasing the counterbalance force acting on beam 1. Engagement of disk 117 with disk 112 at serrations 115 and 116 is facilitated by means of the low tension of spring 122. A stopper 123 is provided to limit the movement of leg 120 towards the bracket 121 due to the spring 122. Solenoid 26 is connected to a limit switch (not shown) in such a manner that solenoid 26 is energized to move disk 117 away from disk 112, and to separate contacts $e$ from contact $d$, responsive to actuation of the limit switch. It is possible to count the frequency of the weighing operations by energizing suitable counter means (not shown) responsive to opening and closing of contact points $d$ and $e$ of the selector.

Corresponding terminals of each of a plurality of indicating lamps 20 are joined together and connected in series to an electric power source 125, and the opposite terminal of each indicating lamp 20 is connected in series with a terminal $e'$ of a respective contact $e$ and a terminal $d'$ of contact $d$. Hence, responsive to selection of a contact from the pluarilty of contacts $e$ corresponding to the angular displacement of shaft 4, a closed circuit for energizing a corresponding indicating lamp is closed. This circuit traces from one end of power source 125, through the selected indicating lamp 20, the selected contact $e$, contact $d$, lead wire 114, roller 29, and a switch 126, to be described hereinafter, back to the opposite end of power source 125. Thus, if an article of the desired weight is placed on scale plate 7, then the indicating lamp to show zero-deviation is energized, while the deviation of the weight of an article in excess of or in short of the desired weight can be also indicated in a similar manner, for instance in different colors or numerals.

In the deviation detector shown in FIGS. 12–A to 12–C, a contact point $d$ is secured to an insulating disk 112. Disk 112 is connected to shaft 4, by means of, for instance, a key 127, in such a way that disk 112 will rotate together with the shaft 4 while allowing a play of a limited magnitude between disk 112 and shaft 4 by providing a notch in the disk, such as notch 112a of FIG. 12–C. In the figure, 128 is a stop-collar and 129 a built-in restoring spring which corresponds to the spring 122 in the preceding example. A shifter arm 27 is operated to shift member 112 when solenoid 26 is energized, and intermeshing of serrations 115 and 116 effects closing of the contacts $d$ and $e$.

When the circuit through contact points $d$ and $e$ is closed, conductive surface 113 makes direct contact with a connector shoe 29', which substitutes for the conductive roller 29, and the selected one of the indicating circuits 20 is energized. In this embodiment, the insulating disk 117 constituted a part of a bearing 111. Upon de-energization of solenoid 26, the upper end of shifter arm 27 and the disk 112 are pulled leftwards by a reset spring 27', to separate contacts $d$ and $e$.

FIG. 13 illustrates a preferred form of the electric control circuit of the deviation detector of FIGS. 12–A to 12–C to be used in the invention. In the above deviation detector, when limit switch S is closed, a current is passed through primary coil 23 of an induction means to produce a pulse voltage across secondary coil 24 of the means, which is then amplified by amplifier 25 to energize solenoid 26. Solenoid 26 is energized in the desired polarity only, when limit switch S is closed, by inserting a diode 131 and a grounding resistor 130 in the circuit of the solenoid.

Prior to energization of solenoid 26, the contacts of limit switch S are open, and shaft 4 is rotated. When limit switch S is closed, contact point $d$ makes contact with a selected one of contacts $e$ and, at the same time, one of the indication lamps 20, corresponding to the selected one of the contacts $e$ is energized through shoe 29', contacts $d$, $e$, power source 125, etc. If the result of the above weighing operation indicates that the weight of the article is beyond the limit of the deviation indicator, then an alarm is given to indicate the necessity of increase or decrease of the quantity of the commodities on scale plate 7.

It is possible to assign the central contact of contacts $e$ to the zero-deviation. However, in FIG. 13, the first contact from the extreme right end of the contact series is used for indication of an excessive weight, the second for zero-deviation, the third for deficit by one unit ($-1$), the fourth for deficit by two units ($-2$), etc. In this case, a device 132, for adding the commodities by the amount indicated by the indicator, is connected to the control circuit in parallel to each one of contacts $e$ to indicate deficits, as shown in the figure. Thus, it is made easier to dispense the commodities into a number of groups of the standard weight. In a preferred embodiment of the device for adding deficit amounts of such commodities, as shown in FIG. 13, three elements 132a, 132b, and 132c, adapted to add the commodities in multiples of the unit weight in a geometric series, such as 1, 2 and 4 times the unit weight, respectively, are provided. With the three elements shown in the figure, the commodities can be added in multiples of the unit weight up to 7 times thereof, and the multiples can be any integer less than 7.

Source 125 should be connected properly to the adding elements depending on which one of the indicating contacts $e$ is selected; namely, for the deviation of ($-1$), ($-2$) or ($-4$) units of weight, adding element 132a, 132b or 132c, respectively, is connected directly to power source 125; for the deviation of ($-3$) units, elements 132a and 132b are connected through diodes 133; for the deviation of ($-5$) units, elements 132a and 132c through diodes 133; for the deviation of ($-6$) units, the elements 132b and 132c through diodes 133; and for the deviation of ($-7$) units, all the elements 132a, 132b and 132c through diodes 133.

In the circuit of FIG. 13, no connection to such adding elements is provided for the terminal of zero-deviation. It is preferable to provide a buzzer 134 or a red lamp 135 connected to the terminals $e$ of out-of-range deviation, upon either an excess or shortage of the weight.

The period during which the circuit between contacts $d$ and $e$ is closed is limited to a very short time. Namely, the circuit is closed responsive only to closing of contacts $a$, $b$ of limit switch S. Therefore, it is preferable to provide suitable time lag means, such as a time delay relay 124, in the circuit. It should be noted here that the size of notch 112a of FIG. 12–C should be large enough to allow rotation of shaft 4 even when contacts $d$ and $e$ are kept closed for the period of time set by such a time delay relay.

In FIGS. 11–A to 11–C, the mutual inductive means are not used but solenoid 26 is energized during the time when contacts $a$ and $b$ of limit switch LS are closed. Thus, the solenoid is de-energized by opening the circuit at contacts $a$ and $b$ to select a proper one of the contacts $e$. Accordingly, the time lag mechanism is unnecessary and the indicating and adding means shown in FIG. 13 can be directly connected to the power source.

It is also permissible to actuate the deviation indicating means responsive to opening of the circuit between contacts $a$ and $b$ of limit switch S.

An embodiment of the adding means will be described later.

In any case, it is possible to indicate the deviation of the thus measured weight from the desired weight, either in excess or in deficit, expressed by multiples of unit weight, by selecting a corresponding contact $e$, and it is also possible to adjust automatically the weight of commodities to be weighed by adding the commodities in proper multiples of the unit weight.

FIGS. 14 and 15 show a modified type of the deviation detector incorporating means for indicating the deviation of weight by using pulses generated by an interrupter, means for an out-of-range indication, and means for adding the commodities to make up for the shortage.

In order to facilitate modification of the magnitude of the unit of weight, a horizontal lever 136, which swings in a vertical plane responsive to movement of a balance beam 1, is pivotally supported by a horizontally movable fulcrum rod 137, and a float 138 is pivotally suspended in one end of lever 136, as shown in FIG. 14. Thus, the increase in buoyancy, acting on that part of float 138 which is dipped in liquid 139, is added to the increment of the elastic tension of counterbalance spring 8 in a direction to bring beam 1 to its balanced position. The magnitude of the unit weight to be detected by the deviation detector of the invention may be adjusted by regulating the positon of fulcrum rod 137.

A limiting rod 92 is provided with a jaw 92a having a normally open contact Sa and a normally closed contact Sb, and biased to engage cam 5' by the downward elastic force of spring 94. The load due to a counterbalance weight 8', which is preferably somewhat heavier than the weight of the article to be weighed, is supported by cam 5' through rod 92. Cam 5' is unidirectionally rotated in a clockwise direction, as shown by an arrow $A_1$, together with shaft 4, to allow elongation of spring 8. In this example, the gravitational force acting on the article placed on scale plate 7 can be supported at limiting rod 92 by means of the counter weight 8' and spring 8. However, a bearing point 9 may be provided to support said gravitational force.

With counter weight 8' applied to the righthand end of beam 1, as the shaft 4 is rotated from the initial position shown by 0 in the figure, beam 1 is also rotated in a clockwise direction while raising the article to be weighed on scale plate 7. Accordingly, the elastic tension of counterbalance spring 8 and the buoyancy of float 138 are increased. Therefore, during the balancing motion responsive to downward movement of limiting rod 92, that part of the weight of counter weight 8' which is in excess of the weight of the article is compensated gradually by the combined effect of the increasing buoyancy of float 138 and the elastic tension of spring 8. Therefore, a heavier article comes to the balanced position earlier than a lighter one.

It is possible to transfer the article thus weighed to the next following process, such as onto a belt conveyor, by lifting or tilting scale plate 7. In this case, the rotation of shaft 4 of the weighing cycle should preferably be synchronized with the speed of the belt conveyor or any other suitable means for receiving commodities thus weighed.

If the weight of the commodities to be weighed is heavier than the measuring range of the weighing device, as cam 5' is rotated by an angle α, as illustrated in FIG. 14, scale plate 7 is lifted by the distance α' and, at the same time, a limit switch Su is closed by means of a boss 141 projecting from the surface of a pulse generating disk 140 secured to shaft 4. In the meantime, as the weight of the commodities to be weighed is balanced with the composite effect of the gravitational force acting on counter weight 8', elastic tension of counterbalance spring 8 and buoyancy of float 138, the circuit between contacts Se and Sb is opened. As limiting rod 92 is further pulled down by spring 94, responsive to rotation of cam 5', the circuit between contacts Se and Sa is closed. Then, according to the wiring diagram shown in FIG. 15, an alarm 142, for indicating the weight is in excess of the weighing range, is operated through contacts Sa–Su–Sc. The contact Sc is a normally closed contact which is opened upon starting of pulse generation, as will be described hereinafter.

If commodities to be weighed are a little lighter than the above and the contact Sa is not closed, at the above stage or at an angular displacement α of the cam 5', the resultant force due to counterbalance spring 8 and float 138 is increased as cam 5' is further rotated. If balance beam 1 is brought to its balanced position when cam 5' is rotated through an angle in the ranges β and γ following the aforementioned movement through the angle α, a circuit, including a pulse contact Sp which is actuated intermittently by the engagement of its actuating member with a series of notches 143 formed on the circumference of the pulse sending disk 140, is made ready, and this circuit is energized when the contact Sa is closed. Thus, the pulse signals are transferred to a pulse counter 144 during the period of time when cam 5' is further rotated to the end of the series of notches, which corresponds to the lower limit of the weighing range. The electromagnetic counter 144 is operated by the pulses to indicate the deviation, of the weight of the commodities thus weighed from the standard weight, in multiples of a suitable unit weight, for instance in numeral characters. If the balanced position of the weighing device for the standard weight is set at the boundary between the angles β and γ, then the respective ranges expressed by the angles β or γ indicate that the weight of the article is in excess or short, respectively, of the standard weight. In the meantime, as counter 144 is actuated due to the first pulse through contacts Sp, the contact Sc is opened to interrupt the circuit of signal 142 which indicates excessive weight beyond the range of the device. By providing an arc-extinguishing circuit D.C. to the pulse contacts Sp, as shown in FIG. 15, the arc due to making and breaking the contacts is extinguished.

If the weight is so light as not to bring balance beam 1 to its balanced position when cam 5' is rotated through an angle equivalent to the sum of the angles α, b and γ, then contact Sa is never closed, and hence another boss 145 on the disk 140 actuates and closes contacts Sd to actuate an alarm or indicator 146 for out-of-range shortage of the weight of the article being weighed, which indicator is connected between contacts Sb and Sd.

Then the cam 5' comes to an inoperative or return stroke and, at the beginning of the return stroke, a pin 146a projecting from the surface of the disk 140 strikes a reset lever 147 of the counter 144 to reset it and to close the contacts Sc at the same time.

It is possible to carry out a conutinuous weighing operation by repeating the aforementioned operation in cycles. It is also permissible to apply the elastic force of counterbalance spring 8 and the buoyancy of float in such a manner as to increase the effect of counter weight 8', or to arrange the elastic force and buoyancy as to work in opposition. Also possible is to apply adding means, such as those shown in FIG. 13, by using the electromagnetic counter 144 to select the proper one of the contacts e to meet the contact d. However, it is necessary to add a suitable stepping motor or a suitable rotary solenoid which is responsive to the pulse signals.

To clarify the operation of the weighing device shown in FIGS. 14 and 15, it is assumed that the desired weight of each group of the commodities to be dispensed is 15 grams, the minimum weight to actuate the alarm 142 for excessively heavy weight is 20 grams, the maximum weight to actuate the alarm 146 for excessively light weight is 10 grams, and the pulses are generated at a rate of 1 pulse gram for the range of 10 to 19 grams (inclusive). Under such assumptions, for instance, for groups of commodities weighing 19, 15 and 11 grams, respectively, there will be produced 10, 6 and 2 pulses, respectively. To carry out proper addition of the commodities of a particular group, say a group weighing 11 grams, for obtaining the desired weight, the number of pulses for the desired weight, six pulses, should be subtracted from the number of pulses thus generated for the particular group, say 2 pulses. The number of pulses thus derived for representing the deficit weight of the particular group, say minus four pulses obtained by subtracting six pulses from two pulses, can be used for driving a deficit supplementing means, such as a stepping motor of a belt conveyor, for a time period proportional to the number of pulses, in order to add the commodities to each group at a constant feeding rate by the amount equivalent to the deficit weight thus determined. Accordingly, one can automatically dispense pourable commodities into a plurality of groups of desired weight.

It should be noted here that, according to the invention, the deficit weight of each group of the commodities is determined separately and the commodities amounting to said deficit weight are added to the group without affecting the measuring procedure. Therefore, the measuring errors due to the kinetic energy of the commodities striking the scale plate can be eliminated completely. Furthermore, the accuracy of the weight of each group can be improved as far as one wishes by increasing the number of pulses per unit weight and by repeating the weighing-supplementing operations.

The conditions for giving alarms and for generating pulses are not limited to those of the above example, but they may be modified in various ways according to the method of the invention. For instance, the pulse generation for the group of excessively high weight may be completely eliminated to produce more accurate pulses for a wider range of deficit weight.

FIG. 16-A shows a practical example of a continuous weighing device for weighing pourable granular commodities based on the principles of the weighing device shown in FIG. 10, in which the commodities to be weighed are automatically placed on scale plate 7 when it is at the highest position of its vertical movement and the balanced position of balance beam 1 is obtained during the downward stroke of scale plate 7.

After the commodities are loaded to the device as described in the foregoing, a cam shaft 4, having a cam 5′ secured thereto, is rotated to move a limiting rod 92 downwards, and hence balance beam 1 is rotated in a clockwise direction, as viewed from the front of FIG. 16-A, until the composite force of the elastic tension of counterbalance spring 8 and counter weight 8′ is so increased as to balance the gravitational force acting on the commodities to be weighed. Then balance beam 1 is held stationary at a balanced position. Limiting rod 92 continues its downward movement, as cam 5′ is further rotated, by means of the elastic force of return spring 94 urging rod 92 downwards to close contacts $a$ and $b$ of limit switch S.

As a result, a servomotor 150, for adding the commodities by the amount short of the desired standard weight, is actuated by an electric current supplied through a circuit including contacts $a$ and $b$ until a limit switch 60 is opened by another cam 5″ when the desired weight of the commodities is placed on scale plate 7. Thus, the commodities short of the desired standard weight are supplied automatically by a belt conveyor 151 feeding the commodities at a constant flow rate. The flow rate of the commodities on conveyor 151 is controlled by regulating the thickness and the width of commodities conveyed thereon as well as the feeding speed thereof. In FIG. 16-A, 178 is a variable voltage transformer for regulating the feeding speed of conveyor 151.

If the commodities to be weighed consists of granular particles of uniform fineness, it is also permissible to use a suitable pulse generator, such as the one shown in FIG. 14, instead of the limit switch 60, so that a certain number, or a certain volume, of said particles may be placed on scale plate 7 step-by-step responsive to pulses produced by said pulse generator depending on the magnitude of the deviation of the weight of the commodities on the scale plate from the desired weight, in which said deviation may be expressed in multiples of a certain unit weight as described in the foregoing. In this case, it is preferable to use a suitable step-by-step operating means, such as a stepping motor or a rotary solenoid, instead of the continuously operating servomotor 150 in FIG. 16-A.

FIG. 16-A shows a partly enlarged view of an example of such means for indicating the deviation of the weight of commodities in a group from the desired weight in multiples of a unit weight in excess or in short thereof, the indicating means being adapted to indicate the out-of-range weight beyond the capacity of the weighing device.

In the figure, a pinion 154 is secured to the extreme left end of an extended shaft 152 of servomotor 150 supported by a bearing 153, and a bell crank 156, having another pinion 155 engaged with pinion 154, is loosely fitted to the shaft 152. A horizontally movable slider 158, having a rack 157 formed on the lower edge thereof so as to be engageable with pinion 155, is supported by guide members 159 and 160 at opposite ends thereof, and a magnetic pole piece is secured to the free end of bell crank 156 so as to be attracted to a solenoid 161, when the latter is energized, to urge pinion 155 upwards to engage rack 157.

A graduated plate 164 is supported by stays 162 and 163 secured to guide members 159 and 160, in order to facilitate the indication of the position of an indicator 165 secured to slider 158. The indicator 165 is actuated in the same manner as the device described hereinbefore with reference to FIG. 4. Solenoid 161 is energized by an electric power source 167 through a contact switch 166, which is, during the weighing stroke, closed by a cam 5‴ secured to shaft 4, in order to engage pinion 155 with rack 157 to move slider 158. Springs 168 and 169 bias bell crank 156 and slider 158, respectively, to their central positions.

With the aforementioned mechanism, as servomotor 150 rotates, slider 158 moves rightward during the period of time when balance beam 1 is moved from its initial balance position to a balanced position with a load on scale plate 7 and the contact 60 is opened, and hence the amount of deficit can be detected through the movement of indicator 165 along graduated plate 164 until the desired weight of the commodities are placed automatically on scale plate 7. In the meantime, if the weight of the commodities on scale plate 7 is too light to actuate servomotor 150, provided that the limit switch 60 is closed, then slider 158 reaches the extreme right end of its stroke to close the contacts of the limit switch $Sd$, and thus activate alarm 146 for indicating the out-of-range shortage.

On the other hand, means 142, for alarming in the case of an excessively heavy weight outside of the measuring range of plate 164 is activated by limit switches $Su_1$, which is closed when slider 158 is at the extreme left end of its stroke, and $Su_2$, which is closed by a boss 170 on cam 5‴ right after limit switch 60 is opened. In this case, indicator 165 does not move at all. As soon as slider 158 starts to move rightward, limit switch $Su_1$ is opened and alarm 142 is de-energized.

Instead of belt conveyor 151 to add the commodities responsive to movement of slider 158, adding and indicating means as described with reference to FIG. 13 may also be used.

In FIG. 16-A, 171 is a feed hopper, 172 is an actuator of limit switch $Sd$, and 173 is a stopper formed on a regulating piece 174 having the limit switch $Su_1$ secured thereto.

FIG. 16-B illustrates the wiring diagram of a weighing device similar to the device shown in FIG. 16-A, in which the balanced position of balance beam 1 is obtained during upward movement of limiting rod 92. In FIG. 16-B, rod 92 is connected to the lefthand end of balance beam 1. Limit switch S comprises fixed contacts 176a, 176b placed in an insulating oil tank 175 fixed to the lower member of head 92a of rod 92, and a movable contact 177 fixed to beam 1. The contacts are so arranged as to close the circuit between contacts 176a and 176b when the balanced position of beam 1 is obtained, as shown in the figure. Thus, the limit switch S incorporated in the balancing system can be free from wear and functions excellently for a long time without using special material, due to the fact that the contacts of the limit switch S are closed when the balanced position is obtained, while the arc, followed the circuit opening operation, is generated at the limit switch 60. Switch S is opened only after breaking operation of limit switch 60, and hence the simple construction of the contacts as shown in the figure may be used satisfactorily. In the figure, 179 is a relay responsive to closing of switch S, and $E_0$ is an electric power source. The other wiring may be easily understood by those skilled in the art, by comparison with corresponding parts in FIG. 16–A.

The feeding means illustrated in FIG. 16–A is suitable for granular commodities. In case of massive commodities, such as tablets of medicine, it is also possible to use said means with a slight modification.

FIG. 17–A shows a practical example of a device for adding tablets to scale plate 7 one-by-one, based on the principle as described with reference to FIG. 13. An aligning rotary arm 187 is rotated at a low speed by a motor 188 connected thereto through a shaft 192, around the center of an inclined disk plate 186, and the tablets fed from a hopper 189 are aligned toward the discharge chute 190 in a manner to be described hereinafter.

The rotary arm 187 consists of outer straight portions 191 which slide on the surface of the inclined disk plate 186, a pair of inner raised portions 193 which are secured to the motor shaft 192 in diametrically opposite directions, and a pair of connecting portions 194 to connect the outer straight portion to the inner raised portions 193. Outer portions 191 extend in diametrically opposite directions on disk plate 186, and are made of suitable wires.

As arm 187 is rotated in the direction as shown by an arrow in FIG. 17–A while passing outer straight portions 191 through the gap between plate 186 and the bottom opening of hopper 189, those tablets which do not make direct contact with the surface of the plate 186 are halted by a rear wall of the hopper 189 while those tablets which make direct contact with the surface of inclined disk plate 186 are swept out of the gap by arm 187. Then, as arm 187 is further rotated, the tablets are pushed upwards to the higher portion of the inclined surface of disk plate 186, and outer straight portion 191 of the arm also is inclined to such an extent that at least the tablets slide down along the upper edge of the arm to the left-hand side of the discharge chute 190, passing underneath the connecting portions 194. The chute 190 is divided into sections 195a, 195b, 195c and 195d by partitioning walls 195, of which section 195a holds the tablets in a single row while each of the other sections holds them in two rows. The tablets are aligned by arm 187 so as to fill section 195a at first, and then fill the next adjacent section 195b after section 195a is filled by continuous rotation of arm 187, and so forth toward the sections 195c and 195d, in turn in a similar manner, until all sections are filled with tablets. Then the tablets left on the plate 186 are circulated thereon between the bottom of the hopper 189 and the entrance portion of the chute 190. Therefore, it is preferable to provide motor shaft 192 with a suitable clutch which disengages itself responsive to an excessive load on motor 188. In the discharging chute 190, section 195a feeds the tablets one-by-one, and section 195b feeds them two-by-two, while sections 195c and 195d cooperate with each other for feeding four tablets at a time. In the figure, 196 is a guide wall.

FIG. 17–B shows the detailed construction of the feeding mechanisms at the ends of feeding sections 132a, 132b and 132c. Each section comprises a receiving element 198, to receive tablets from the surface of the chute 190, and a bent cover 197 having an opening whose height is equivalent to the thickness of the tablets, as shown in the figure. Receiving edge 198 is pivoted to a base frame 200 at the shaft 199. A suitable lever means 202, biased by a spring 201, is provided at each said feeding section to receive and hold one, two or four tablets, in it, depending on the section, in a manner as shown in FIG. 17–B. A magnetic material rod is secured to the outer lower surface of receiving element 198 in such a manner that the rod is pulled downward by an electromagnet 203 when the latter is energized, so that the receiving element may be tilted to feed the tablets on the element to the bag 205 on scale plate 7 through a chute 204. While the solenoid is energized, bent cover 197 closes the lower end opening of each feeding section 132a, 132b, or 132c. The controlling system of each solenoid 203 may be the same as that described in detail with reference to FIG. 13. It is apparent that the opening at the lower end of each feeding section is opened again upon de-energization of the solenoid, to become ready for next feeding.

FIG. 18 shows still another embodiment of the invention, in which the counterbalance spring 8 at the righthand side end of the balance beam 1, as viewed from the front of the figure, is elongated by an external force through a fulcrum rod 2d guided by vertical guides 2a and 2b responsive to upward movement of fulcrum 2, as described in detail hereinbefore referring to FIG. 1. A limit switch LS, comprising contacts a, b and c, is provided on that side of beam 1 where scale plate 7 is connected, and the circuit including the contacts a and b is connected to reversible motor 3 to rotate it in a clockwise direction, while contacts a and c are used to rotate motor 3 in a counterclockwise direction, responsive to loading and unloading of the articles to be weighed on scale plate 7.

A pinion 5 is secured to shaft 4 of reversible motor 3, and fulcrum 2 is lifted against the elastic force of spring 8 through a rack 6 on fulcrum rod 2c. When the balanced position of the fulcrum 2 is obtained with a load on scale plate 7, or after scale plate 7 has disengaged support member 9, shaft 4 is stopped. Then, a solenoid 207 is actuated responsive to the opening of contacts a and b, so that a pawl 208a, secured to an armature 208 cooperating with solenoid 207, is forced into a notch formed on the periphery of a limiting disk 206 affixed to shaft 4. By the forced engagement of pawl 208a into the notch of disk 206, shaft 4 is further rotated to move scale plate 7 upwards. The magnitude of the upward movement of scale plate 7, due to engagement between pawl 208a and disk 206, which is equivalent to the deviation of the weight of the article being weighed from the standard weight, is detected by a differential transformer 209 which is connected to the reversible motor through a potentiometer. It is possible to arrange the above-mentioned forced engagement of pawl 208a with the notch of disk 206 in such a manner that the angular position of shaft 4 determined by the forced engagement coincides with that for the balanced position of beam 1 with the desired weight on scale plate 7. Then the output of differential transformer 209 can be used for supplementing the commodities onto scale plate 7 by the amount in deficit of the desired weight, because this output represents the difference between the measured weight of the desired weight. Furthermore, the output of differential transformer 209 may be used for operating a printing or recording means if so desired. A graduated plate 215 is secured to shaft 4 and cooperates with a pointer 216 secured to a balancing motor 211 which is actuated by the output of differential transformer 209. Thus, the additional rotation of shaft 4 is followed by balancing motor 211 to give the correct indication of the weight of the commodities being weighed.

FIG. 19 illustrates another weighing device for carrying out nearly the same weighing operation as that described above with reference to FIG. 18, in which no spring is used in the balancing system, but a counterbalance weight 8' is used instead of a spring. The gravitational force acting on the commodities to be weighed is received at an intermediate point 218 of balance beam 1, while fulcrum 2 and a force point 217 related to the counter weight 8' are located at opposite ends of 1.

Weight 8' is adjustably secured to a weight rod 222 fixed to a cam 221 pivotally supported by a support rod 220 depending from a fixed point 219, and force point 217 is connected to one end of cam 221 through a flexible but inextensible cord 223 extending along the surface of cam 221. In the figure, 224 is a Roberval lever.

With counter weight 8' depending vertically underneath supporting point 219, the initial no-load balanced position is determined, and then, as the load is mounted on scale plate 7, a vertical rod 1c supporting scale plate 7 is lowered to rotate the cam 221 slightly and close contacts a and b. Accordingly, reversible motor 3 is rotated to raise fulcrum 2 through shaft 4, pinion 5 and rack 6.

The position of the pivoted intermediate gravity point 218 is not changed by this movement of fulcrum 2, but the force point 217 is lowered to rotate cam 221 against the gravitational pull of counter weight 8', as shown by the dotted line in FIG. 19. It is preferable to determine the configuration of the surface of cam 221 in such a manner that the magnitude of the counterbalancing force acting at force point 217 is proportional to the distance by which the fulcrum is raised. Thus, as the magnitude of the counterbalancing force is increased so as to balance the gravitational force acting on the commodities to be weighed, the scale plate is lifted to open contacts a and b. At the same time, solenoid 207 is energized to force pawl 208a of armature 208 into a notch of limiting disk 206. Thus, balance beam 1 and, accordingly, scale plate 7 are further raised. The extra movement of scale plate 7 is detected by differential transformer 209 to effect the correction of the indication by moving pointer 216 cooperable graduated plate 215 and secured to the shaft 4.

When the commodities are removed from scale plate 7, the balanced condition of the weighing device is lost to raise scale plate 7, and contacts a and c are closed. Shaft 4 then is rotated in a counterclockwise direction to return the balancing system to the initial no-load balanced position. In the meantime, pawl 208a is withdrawn from limiting disk 206 so as not to interrupt the returning operation of the system.

FIG. 20 is a diagram similar to FIG. 2 illustrating the electrical control system of the device shown in FIG. 18 or 19. One terminal a' of an electric power source 228 is connected to contact a of a limit switch, and the other terminal j is connected to both windings $W_1$, $W_2$ of reversible motor 3, at terminals j', j" thereof, respectively, as shown in the figure. The terminal b' of winding $W_1$ and the terminal c' of winding $W_2$ of reversible motor are connected to the respective terminals b and c of the limit switch. In addition, solenoid 207 is connected in parallel with either of the windings $W_1$ and $W_2$ whenever either one of the latter is energized, and hence movable armature 208 in solenoid 207 is pulled upwards upon energization of reversible motor 3, in order to disengage pawl 208a from limiting disk 206, such as those shown in FIGS. 18 and 19. Return spring 229 biases armature 208 downwards unless contacts a and b or a and c are closed. It is, of course, possible for spring 229 to bias armature 208 in the opposite direction provided that solenoid 20y is so wound and controlled as to urge armature 208 downwards unless reversible motor 3 is energized.

On the other hand, differential transformer 209 comprises a primary coil 231 excited from the electric source 230, a pair of secondary coils 232 wound in opposite directions, and a movable iron core 226. The mechanical displacement of iron core 226 is transformed into an electric quantity which is fed to an amplifier 210 in order to actuate balancing motor 211.

In differential transformer 209, the magnitude of the displacement of core 226 represents only a minor deviation of scale plate 7 from the desired position, which deviation is caused by a small angular displacement following the forced engagement of pawl 208a with a notch of limiting disk 206, and hence there is no difficulty in designing and manufacturing a differential transformer, having an acceptable accuracy, at a reasonable cost.

While specific embodiments of the invention have been shown and described in detail to illustrate the application of the principles of the invention, it will be understood that the invention may be embodied otherwise without departing from such principles.

What is claimed is:

1. Apparatus for weighing for dispensing pourable commodities and sorting articles in accordance with desired standard weights of dispensed quantities of commodities and or sorted articles, said apparatus comprising, in combination, a balance beam; means pivotally supporting said balance beam at a fulcrum; a scale plate pivotally connected to said balance beam; a variable force counterbalance means connected to said balance beam; means operable to discharge onto said scale plate, a predispensed quantity of commodities weighing less than said desired weight, or an article; support means limiting resultant gravitational movement of said scale plate to a fixed limiting position; a reversible motor having a rotatable shaft; means operable, responsive to engagement of said scale plate with said support means, to energize said motor to rotate said shaft; transmission means connecting said shaft to said balance beam and operable to displace said balance beam in a direction to increase the force of said counterbalance means in proportion to the angular displacement of said shaft; said balance beam being displaced sufficiently to disengage said scale plate from said supporting means when the variable counterbalance force has been increased to a value sufficient to balance the gravitational force acting on said scale plate, with the weight of the commodities or article on said scale plate corresponding to the angular displacement of said shaft when said scale plate begins to disengage said support means; means operable to measure the difference between the angular displacement of said shaft when said variable counterbalance force balances said gravitational force and a predetermined angular displacement of said shaft when said balance beam is balanced with a preselected weight on said scale plate, as a measure of the deficit weight of the predispensed commodities on said scale plate or the difference between the weight of an article and said preselected weight.

2. Apparatus, as claimed in claim 1, including means operable, responsive to such measuring and when commodities are on said scale plate, to feed commodities to said scale plate in an amount sufficient to supplement the predispensed quantities of commodities by the measured amount of said deficit weight.

3. Apparatus, as claimed in claim 1, including means operable, responsive to such balancing when an article is on said scale plate, to tilt said scale plate to transfer the article to a sorting means in accordance with its measured weight.

4. Apparatus, as claimed in claim 3, in which said sorting means is rotatable about the axis of a shaft mounting the same; and means operable, responsive to rotation of said first mentioned shaft, to rotate said sorting means to an article receiving position and through an angular distance corresponding to the angular displacement of said first-mentioned shaft.

5. Apparatus, as claimed in claim 1, including a differential transformer having a movable member; means connecting said movable member to said scale plate for displacing said movable member in accordance with displacement of said scale plate; a cam secured to rotate with said shaft and having at least one peripheral notch; a reciprocable magnetic armature arranged to engage in a notch of said cam, said armature being located at a position corresponding to the angular position of said shaft when the variable force of said counterbalance means exerted on said balance beam balances a standard weight on said scale plate; means biasing said armature to disengage said cam; a solenoid operable, when energized, to move said armature to engage said cam against the bias of said biasing means; means operable, responsive to disengagement of said scale plate from said support means, to de-energize said motor and to energize said solenoid to force said armature into a notch of said cam to rotate said shaft to an angular position corresponding with the position of said armature; the output of said differential transformer, responsive to displacement of the movable member thereof by said scale plate, providing a measure of the deficit weight of the predispensed commodities from said standard weight as the difference between the angular displacement of said shaft when said variable counterbalance force balances the gravitational force on said scale plate and a predetermined angular displacement effective to bring the angular position of said shaft into correspondence with the position of said armature; means operable to feed commodities to said scale plate to supplement said predispensed quantity of commodities thereon; and relay means connected to the output of said differential transformer and operable, in accordance with the output of said differential transformer, to control operation of said supplementing means to supplement said quantity of commodities on said scale plate by an amount equal to said deficit weight.

References Cited
UNITED STATES PATENTS

| | | | |
|---|---|---|---|
| 1,523,511 | 1/1925 | Bryce | 177—212 |
| 1,878,554 | 9/1932 | Townshend et al. | 177—212 |
| 2,004,745 | 6/1935 | Becker | 177—167 X |
| 2,981,412 | 4/1961 | McQueen et al. | 209—121 |

UNITED STATES PATENTS

RICHARD B. WILKINSON, *Primary Examiner.*